United States Patent
Azizi et al.

(10) Patent No.: US 10,015,745 B2
(45) Date of Patent: *Jul. 3, 2018

(54) APPARATUS, SYSTEM AND METHOD OF COMMUNICATING A WAKEUP PACKET

(71) Applicant: INTEL CORPORATION, Santa Clara, CA (US)

(72) Inventors: Shahrnaz Azizi, Cupertino, CA (US); Minyoung Park, Portland, OR (US); Alexander W. Min, Portland, OR (US); Vallabhajosyula S. Somayazulu, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 82 days.

This patent is subject to a terminal disclaimer.

(21) Appl. No.: 14/998,242

(22) Filed: Dec. 26, 2015

(65) Prior Publication Data

US 2016/0374020 A1    Dec. 22, 2016

Related U.S. Application Data

(60) Provisional application No. 62/180,155, filed on Jun. 16, 2015.

(51) Int. Cl.
*H04W 52/02* (2009.01)
*H04L 5/00* (2006.01)

(52) U.S. Cl.
CPC .......... *H04W 52/0229* (2013.01); *H04L 5/00* (2013.01); *H04W 52/028* (2013.01); *Y02D 70/00* (2018.01);

(Continued)

(58) Field of Classification Search
CPC . H04B 7/2656; H04L 5/0007; H04L 41/0896; H04L 67/104; H04L 67/1053;

(Continued)

(56) References Cited

U.S. PATENT DOCUMENTS 8,307,231 B2 * 11/2012 Radulescu .......... H04M 1/7253
340/539.13
8,675,688 B2 *  3/2014 Oh .................... H04W 52/0235
370/509

(Continued)

FOREIGN PATENT DOCUMENTS

CN         105723780 A  *  6/2016  .......... H04L 67/104
WO   WO-2015094446 A1 *  6/2015  .......... H04L 67/104

OTHER PUBLICATIONS

Park et al., Low-Power Wake-Up Receiver (LP-WUR) for 802.11, IEEE Document No. 802.11-15/1307r1, Nov. 10, 2015, IEEE (Year: 2015).*

(Continued)

*Primary Examiner* — Eric Nowlin
(74) *Attorney, Agent, or Firm* — Shichrur & Co.

(57) ABSTRACT

Some demonstrative embodiments include apparatuses, devices, systems and methods of communicating a wakeup packet. For example, an apparatus may be configured to cause a first wireless device to generate a wakeup packet configured to wake up a receiver of a second wireless device; and to transmit the wakeup packet over a wakeup Resource Unit (RU) allocation of an Orthogonal Frequency Division Multiple Access (OFDMA) structure.

23 Claims, 10 Drawing Sheets

(52) U.S. Cl.
CPC ...... *Y02D 70/1224* (2018.01); *Y02D 70/1262* (2018.01); *Y02D 70/1264* (2018.01); *Y02D 70/142* (2018.01); *Y02D 70/144* (2018.01); *Y02D 70/146* (2018.01); *Y02D 70/162* (2018.01); *Y02D 70/164* (2018.01); *Y02D 70/166* (2018.01); *Y02D 70/168* (2018.01); *Y02D 70/22* (2018.01); *Y02D 70/26* (2018.01)

(58) Field of Classification Search
CPC . H04W 28/22; H04W 52/0229; H04W 72/02; H04W 72/023; H04W 72/04; H04W 72/0406; H04W 74/002; H04W 76/046; H04W 88/04; H04W 92/18; H04W 52/02; H04W 52/0225; H04W 52/0235; H04W 84/12; Y02B 60/50

See application file for complete search history.

(56) References Cited

U.S. PATENT DOCUMENTS

| | | | | |
|---|---|---|---|---|
| 9,232,467 | B2* | 1/2016 | Seo | H04L 5/001 |
| 9,282,582 | B1* | 3/2016 | Dunsbergen | H04W 48/12 |
| 9,288,752 | B2* | 3/2016 | Panta | H04W 52/0203 |
| 9,386,610 | B2* | 7/2016 | Dunsbergen | H04W 48/12 |
| 9,485,733 | B1* | 11/2016 | Park | H04W 52/0235 |
| 9,736,870 | B1* | 8/2017 | Dunsbergen | H04W 48/12 |
| 9,801,133 | B2* | 10/2017 | Min | H04W 52/0229 |
| 9,820,226 | B2* | 11/2017 | Thomson | H04W 52/0216 |
| 9,848,385 | B2* | 12/2017 | Park | H04W 52/0235 |
| 2009/0285163 | A1 | 11/2009 | Zhang et al. | |
| 2010/0054168 | A1 | 3/2010 | Igarashi et al. | |
| 2010/0115130 | A1 | 5/2010 | Jun et al. | |
| 2010/0150042 | A1* | 6/2010 | Oh | H04W 52/0235 370/311 |
| 2011/0140851 | A1* | 6/2011 | Lee | H04W 52/0235 340/9.1 |
| 2011/0268004 | A1* | 11/2011 | Doppler | H04W 72/02 370/311 |
| 2012/0119902 | A1 | 5/2012 | Patro et al. | |
| 2014/0051476 | A1* | 2/2014 | Chawla | H04W 52/0209 455/552.1 |
| 2014/0064170 | A1* | 3/2014 | Seo | H04L 5/001 370/311 |
| 2014/0092824 | A1 | 4/2014 | He et al. | |
| 2014/0105084 | A1 | 4/2014 | Chhabra et al. | |
| 2014/0119253 | A1* | 5/2014 | Weng | H04W 72/042 370/311 |
| 2014/0126442 | A1* | 5/2014 | Jafarian | H04W 52/0212 370/311 |
| 2015/0103707 | A1* | 4/2015 | Panta | H04W 52/0203 370/311 |
| 2015/0131517 | A1 | 5/2015 | Chu et al. | |
| 2015/0286507 | A1 | 10/2015 | Elmroth et al. | |
| 2015/0334650 | A1 | 11/2015 | Park | |
| 2015/0365922 | A1* | 12/2015 | Suh | H04L 5/0007 370/329 |
| 2016/0021612 | A1* | 1/2016 | Matsunaga | H04W 74/0816 370/311 |
| 2016/0113034 | A1 | 4/2016 | Seok | |
| 2016/0119888 | A1* | 4/2016 | Kawamoto | H04W 56/001 370/350 |
| 2016/0128105 | A1* | 5/2016 | Dunsbergen | H04W 48/12 370/329 |
| 2016/0150505 | A1* | 5/2016 | Hedayat | H04W 72/1289 370/329 |
| 2016/0198240 | A1 | 7/2016 | Kim et al. | |
| 2016/0198422 | A1* | 7/2016 | Panta | H04W 52/0203 370/311 |
| 2016/0212702 | A1 | 7/2016 | Ghosh et al. | |
| 2016/0219331 | A1* | 7/2016 | Stewart | H04H 20/42 |
| 2016/0227565 | A1 | 8/2016 | Ghosh | |
| 2016/0227579 | A1 | 8/2016 | Stacey et al. | |
| 2016/0249303 | A1 | 8/2016 | Kenney et al. | |
| 2016/0278013 | A1* | 9/2016 | Shellhammer | H04W 52/0225 |
| 2016/0295511 | A1* | 10/2016 | Qi | H04L 67/104 |
| 2016/0302185 | A1 | 10/2016 | Sun et al. | |
| 2016/0323426 | A1 | 11/2016 | Hedayat | |
| 2016/0330714 | A1 | 11/2016 | Hedayat | |
| 2016/0337973 | A1* | 11/2016 | Park | H04W 52/0235 |
| 2016/0345349 | A1 | 11/2016 | Ferdowsi et al. | |
| 2016/0353435 | A1 | 12/2016 | Ghosh | |
| 2016/0359598 | A1* | 12/2016 | Montreuil | H04L 5/0041 |
| 2016/0374018 | A1* | 12/2016 | Min | H04W 52/0229 |
| 2017/0094600 | A1* | 3/2017 | Min | H04W 52/0229 |
| 2017/0111858 | A1* | 4/2017 | Azizi | H04W 52/0212 |
| 2017/0111866 | A1* | 4/2017 | Park | H04W 52/0235 |
| 2017/0273023 | A1* | 9/2017 | Seok | H04W 74/08 |
| 2017/0280498 | A1* | 9/2017 | Min | H04L 5/0007 |
| 2017/0347385 | A1* | 11/2017 | Dunsbergen | H04W 48/12 |
| 2018/0020410 | A1* | 1/2018 | Park | H04W 52/0235 |
| 2018/0027495 | A1* | 1/2018 | Song | H04W 8/04 |

OTHER PUBLICATIONS

Park et al., LP-WUR (Low-Power Wake-Up Receiver Follow-Up), IEEE Document No. 802.11-16/0341r0, Mar. 14, 2016, IEEE Year: 2016).*

Hong et al., Multi-User Access for Wake-Up Radio, IEEE Document No. 802.11-16/1243r2, Sep. 13, 2016, IEEE (Year: 2016).*

Park et al., OOK Signal Bandwidth for WUR, IEEE Document No. 802.11-17/0655r4, May 8, 2017, IEEE (Year: 2017).*

IEEE Std 802.11™—2012. IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012, 2793 pages.

U.S. Appl. No. 14/864,917, filed Sep. 25, 2015, 74 pages.

Wi-Fi Peer-to-Peer (P2P), Technical Specification, Version 1.5, 2014, Aug. 4, 2014, 183 pages.

Office Action for U.S. Appl. No. 14/864,917, dated Jan. 27, 2017, 29 pages.

* cited by examiner

APPARATUS, SYSTEM AND METHOD OF COMMUNICATING A WAKEUP PACKET

CROSS REFERENCE

This Application claims the benefit of and priority from U.S. Provisional Patent Application No. 62/180,155 entitled "Apparatus, System and Method of Communicating a Wake-Up Packet", filed Jun. 16, 2015, the entire disclosure of which is incorporated herein by reference.

TECHNICAL FIELD

Embodiments described herein generally relate to communicating a wakeup packet.

BACKGROUND

Some computing devices, for example, small computing devices, such as, for example, wearable devices and/or sensors, are constrained by a small battery capacity.

However, such devices may be required to support wireless communication technologies such as, for example, Wi-Fi, and/or Bluetooth (BT), for example, to connect to other computing devices, e.g., a Smartphone, for example, to exchange data.

Exchanging data using the wireless communication technologies may consume power of the battery, and it may be beneficial, or even critical, to minimize energy consumption of one or more communication blocks in such computing devices.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
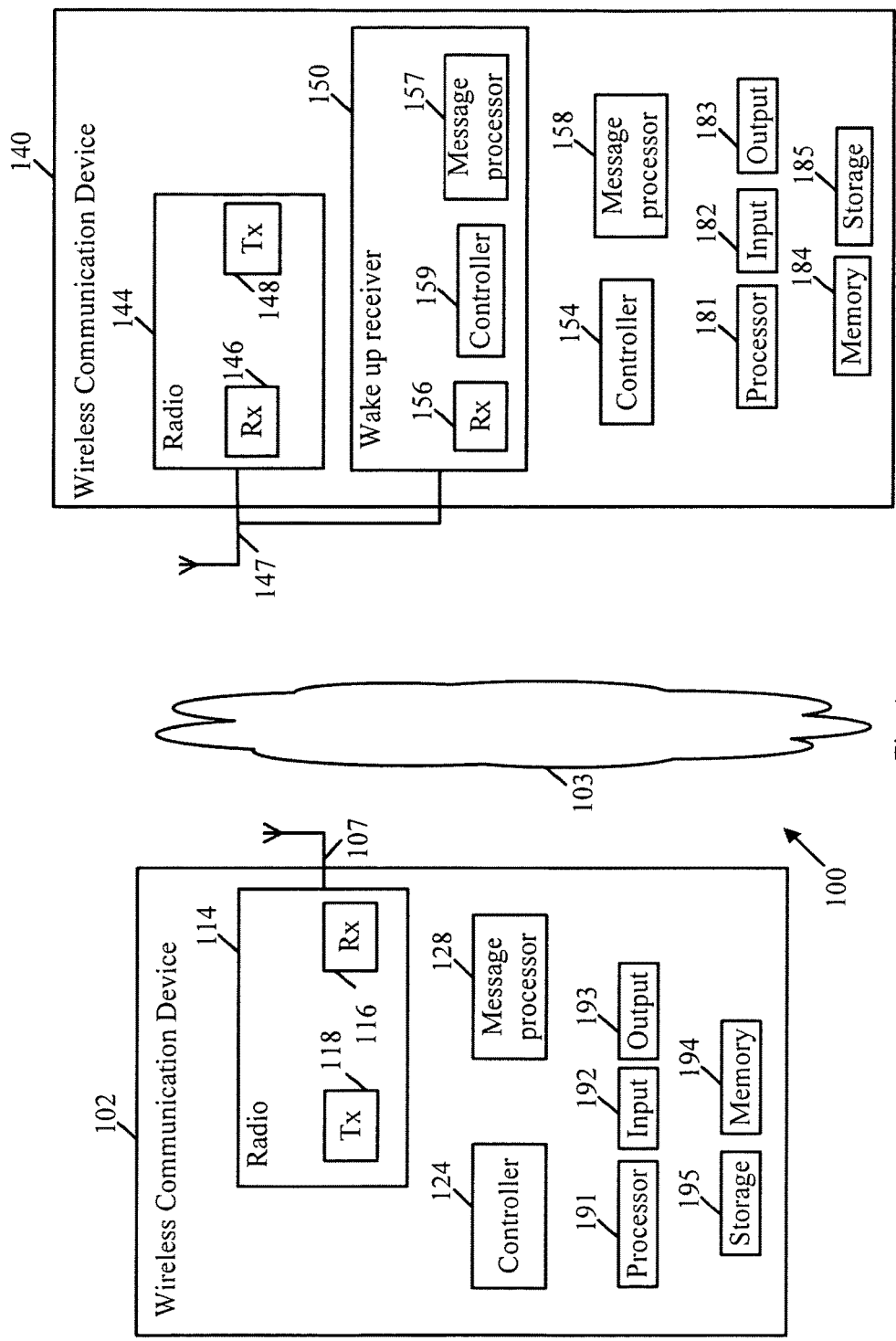
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a User Equipment (UE), a Mobile Device (MD), a wireless station (STA), a Personal Computer (PC), a desktop computer, a mobile computer, a laptop computer, a notebook computer, a tablet computer, a server computer, a handheld computer, a handheld device, an Internet of Things (IoT) device, a sensor device, a wearable device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing IEEE 802.11 standards (including IEEE 802.11-2012

(*IEEE 802.11-2012, IEEE Standard for Information technology—Telecommunications and information exchange between systems Local and metropolitan area networks—Specific requirements Part 11: Wireless LAN Medium Access Control (MAC) and Physical Layer (PHY) Specifications*, Mar. 29, 2012); IEEE802.11ac-2013 ("*IEEE P802.11ac-2013, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 4: Enhancements for Very High Throughput for Operation in Bands below 6 GHz*", December, 2013); IEEE 802.11ad ("*IEEE P802.11ad-2012, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band*", 28 Dec. 2012); IEEE-802.11REVmc ("*IEEE 802.11-REVmc™/D3.0, June 2014 draft standard for Information technology—Telecommunications and information exchange between systems Local and metropolitan area networks Specific requirements; Part 11: Wireless LAN Medium Access Control (MAC) and Physical Layer (PHY) Specification*"); IEEE 802.11ax (*IEEE 802.11ax, High Efficiency WLAN (HEW)*); IEEE802.11-ay (*P802.11ay Standard for Information Technology—Telecommunications and Information Exchange Between Systems Local and Metropolitan Area Networks—Specific Requirements Part 11: Wireless LAN Medium Access Control (MAC) and Physical Layer (PHY) Specifications—Amendment: Enhanced Throughput for Operation in License-Exempt Bands Above 45 GHz*)) and/or future versions and/or derivatives thereof) and/or future versions and/or derivatives thereof, devices and/or networks operating in accordance with existing Wireless-Gigabit-Alliance—(WGA) specifications (*Wireless Gigabit Alliance, Inc WiGig MAC and PHY Specification Version 1.1, April 2011, Final specification*) and/or future versions and/or derivatives thereof, devices and/or networks operating in accordance with existing Wireless Fidelity (WiFi) Alliance (WFA) Peer-to-Peer (P2P) specifications (*WiFi P2P technical specification, version 1.5*, Aug. 4, 2014) and/or future versions and/or derivatives thereof, devices and/or networks operating in accordance with existing cellular specifications and/or protocols, e.g., 3rd Generation Partnership Project (3GPP), 3GPP Long Term Evolution (LTE) and/or future versions and/or derivatives thereof, devices and/or networks operating in accordance with existing Bluetooth (BT) specifications and/or protocols and/or future versions and/or derivatives thereof, units and/or devices which are part of the above networks, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infrared (IR), Frequency-Division Multiplexing (FDM), Orthogonal FDM (OFDM), Orthogonal Frequency-Division Multiple Access (OFDMA), FDM Time-Division Multiplexing (TDM), Time-Division Multiple Access (TDMA), Multi-User MIMO (MU-MIMO), Spatial Division Multiple Access (SDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G), or Sixth Generation (6G) mobile networks, 3GPP, Long Term Evolution (LTE), LTE advanced, Enhanced Data rates for GSM Evolution (EDGE), or the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device.

As used herein, the term "circuitry" may refer to, be part of, or include, an Application Specific Integrated Circuit (ASIC), an integrated circuit, an electronic circuit, a processor (shared, dedicated, or group), and/or memory (shared, dedicated, or group), that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

The term "logic" may refer, for example, to computing logic embedded in circuitry of a computing apparatus and/or computing logic stored in a memory of a computing apparatus. For example, the logic may be accessible by a processor of the computing apparatus to execute the computing logic to perform computing functions and/or operations. In one example, logic may be embedded in various types of memory and/or firmware, e.g., silicon blocks of various chips and/or processors. Logic may be included in, and/or implemented as part of, various circuitry, e.g. radio circuitry, receiver circuitry, control circuitry, transmitter circuitry, transceiver circuitry, processor circuitry, and/or the like. In one example, logic may be embedded in volatile memory and/or non-volatile memory, including random access memory, read only memory, programmable memory, magnetic memory, flash memory, persistent memory, and the like. Logic may be executed by one or more processors using memory, e.g., registers, stuck, buffers, and/or the like, coupled to the one or more processors, e.g., as necessary to execute the logic.

Some demonstrative embodiments may be used in conjunction with a WLAN, e.g., a WiFi network. Other embodiments may be used in conjunction with any other suitable wireless communication network, for example, a wireless area network, a "piconet", a WPAN, a WVAN and the like.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

Reference is made to FIG. 1, which schematically illustrates a system 100, in accordance with some demonstrative embodiments.

As shown in FIG. 1, in some demonstrative embodiments, system 100 may include one or more wireless communication devices. For example, system 100 may include a first wireless communication device 102, and/or a second wireless communication device 140.

In some demonstrative embodiments, device 102 and/or device 140 may include a mobile device or a non-mobile, e.g., a static, device. For example, device 102 and/or device 140 may include, for example, a UE, an MD, a STA, an AP, a PC, a desktop computer, a mobile computer, a laptop computer, an Ultrabook™ computer, a notebook computer, a tablet computer, a server computer, a handheld computer, an Internet of Things (IoT) device, a sensor device, a wearable device, a BT device, a handheld device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a media player, a Smartphone, a television, a music player, or the like.

In some demonstrative embodiments, device 102 and/or device 140 may include, operate as, and/or perform the functionality of one or more STAs. For example, device 102 may include at least one STA, and/or device 140 may include at least one STA.

In some demonstrative embodiments, device 102 and/or device 140 may include, operate as, and/or perform the functionality of one or more WLAN STAs.

In some demonstrative embodiments, device 102 and/or device 140 may include, operate as, and/or perform the functionality of one or more Wi-Fi STAs.

In some demonstrative embodiments, device 102 and/or device 140 may include, operate as, and/or perform the functionality of one or more BT devices.

In some demonstrative embodiments, device 102 and/or device 140 may include, operate as, and/or perform the functionality of one or more Neighbor Awareness Networking (NAN) STAs.

In some demonstrative embodiments, device 102 and/or device 140 may include, operate as, and/or perform the functionality of one or more location measurement STAs.

In one example, a station (STA) may include a logical entity that is a singly addressable instance of a medium access control (MAC) and physical layer (PHY) interface to the wireless medium (WM). The STA may perform any other additional or alternative functionality.

In some demonstrative embodiments, device 102 and/or device 140 may include, operate as, and/or perform the functionality of any other devices and/or STAs.

In some demonstrative embodiments, devices 102 and/or 140 may be configured to operate as, and/or to perform the functionality of, an access point (AP), and/or a personal basic service set (PBSS) control point (PCP), for example, an AP/PCP STA.

In some demonstrative embodiments, devices 102 and/or 140 may be configured to operate as, and/or to perform the functionality of, a non-AP STA, and/or a non-PCP STA, for example, a non-AP/PCP STA.

In one example, an AP may include an entity that contains a station (STA), e.g., one STA, and provides access to distribution services, via the wireless medium (WM) for associated STAs. The AP may perform any other additional or alternative functionality.

In one example, a personal basic service set (PBSS) control point (PCP) may include an entity that contains a STA, e.g., one station (STA), and coordinates access to the wireless medium (WM) by STAs that are members of a PBSS. The PCP may perform any other additional or alternative functionality.

In one example, a PBSS may include a directional multi-gigabit (DMG) basic service set (BSS) that includes, for example, one PBSS control point (PCP). For example, access to a distribution system (DS) may not be present, but, for example, an intra-PBSS forwarding service may optionally be present.

In one example, a PCP/AP STA may include a station (STA) that is at least one of a PCP or an AP. The PCP/AP STA may perform any other additional or alternative functionality.

In one example, a non-AP STA may include a STA that is not contained within an AP. The non-AP STA may perform any other additional or alternative functionality.

In one example, a non-PCP STA may include a STA that is not a PCP. The non-PCP STA may perform any other additional or alternative functionality.

In one example, a non PCP/AP STA may include a STA that is not a PCP and that is not an AP. The non-PCP/AP STA may perform any other additional or alternative functionality.

In one example, device 102 may be configured to operate as, and/or to perform the functionality of the AP, and/or device 140 may be configured to operate as, and/or to perform the functionality of a non-PCP/AP STA.

In some demonstrative embodiments, device 102 may include, for example, one or more of a processor 191, an input unit 192, an output unit 193, a memory unit 194, and/or a storage unit 195; and/or device 140 may include, for example, one or more of a processor 181, an input unit 182, an output unit 183, a memory unit 184, and/or a storage unit 185. Device 102 and/or device 140 may optionally include other suitable additional or alternative hardware components and/or software components. In some demonstrative embodiments, some or all of the components of one or more of device 102 and/or device 140 may be enclosed in a common housing or packaging, and may be interconnected or operably associated using one or more wired or wireless links. In other embodiments, components of one or more of device 102 and/or device 140 may be distributed among multiple or separate devices.

In some demonstrative embodiments, processor 191 and/or processor 181 may include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multipurpose or specific processor or controller. Processor 191 executes instructions, for example, of an Operating System (OS) of device 102 and/or of one or more suitable applications. Processor 181 executes instructions, for example, of an Operating System (OS) of device 140 and/or of one or more suitable applications.

In some demonstrative embodiments, input unit 192 and/or input unit 182 may include, for example, a keyboard, a keypad, a mouse, a touch-screen, a touch-pad, a track-ball, a stylus, a microphone, or other suitable pointing device or input device. Output unit 193 and/or output unit 183 may include, for example, a monitor, a screen, a touch-screen, a flat panel display, a Light Emitting Diode (LED) display unit, a Liquid Crystal Display (LCD) display unit, a plasma display unit, one or more audio speakers or earphones, or other suitable output devices.

In some demonstrative embodiments, memory unit 194 and/or memory unit 184 may include, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 and/or storage unit 185 may include, for example, a hard disk drive, a floppy disk drive, a Compact Disk (CD) drive, a CD-ROM drive, a DVD drive, or other suitable removable or non-removable storage units. Memory unit 194 and/or storage unit 195, for example, may store data processed by device 102. Memory unit 184 and/or storage unit 185, for example, may store data processed by device 140.

In some demonstrative embodiments, wireless communication device 102 and/or device 140 may be capable of communicating content, data, information and/or signals via a wireless medium (WM) 103. In some demonstrative embodiments, wireless medium 103 may include, for example, a radio channel, a cellular channel, an RF channel, a WiFi channel, an IR channel, a Bluetooth (BT) channel, a Global Navigation Satellite System (GNSS) Channel, and the like.

In some demonstrative embodiments, WM 103 may include a channel over a 2.4 Gigahertz (GHz) frequency band, a channel over a 5 GHz frequency band, a channel over a millimeterWave (mmWave) frequency band, e.g., a 60 GHz frequency band, a channel over a sub 1 Gigahertz (SIG) frequency band, and/or any other channel over any other band.

In some demonstrative embodiments, device 102 and/or device 140 may include one or more radios including circuitry and/or logic to perform wireless communication between devices 102, 140 and/or one or more other wireless communication devices. For example, device 102 may include at least one radio 114, and/or device 140 may include at least one radio 144.

In some demonstrative embodiments, radios 114 and/or 144 may include one or more wireless receivers (Rx) including circuitry and/or logic to receive wireless communication signals, RF signals, frames, blocks, transmission streams, packets, messages, data items, and/or data. For example, radio 114 may include at least one receiver 116, and/or radio 144 may include at lest one receiver 146.

In some demonstrative embodiments, radios 114 and/or 144 may include one or more wireless transmitters (Tx) including circuitry and/or logic to transmit wireless communication signals, RF signals, frames, blocks, transmission streams, packets, messages, data items, and/or data. For example, radio 114 may include at least one transmitter 118, and/or radio 144 may include at least one transmitter 148.

In some demonstrative embodiments, radio 114, radio 144, transmitter 118, transmitter 148, receiver 116, and/or receiver 148 may include circuitry; logic; Radio Frequency (RF) elements, circuitry and/or logic; baseband elements, circuitry and/or logic; modulation elements, circuitry and/or logic; demodulation elements, circuitry and/or logic; amplifiers; analog to digital and/or digital to analog converters; filters; and/or the like. For example, radios 114 and/or 144 may include or may be implemented as part of a wireless Network Interface Card (NIC), and the like.

In some demonstrative embodiments, radios 114 and/or 144 may include, or may be associated with, one or more antennas 107 and/or 147, respectively.

In one example, device 102 may include a single antenna 107. In another example, device 102 may include two or more antennas 107.

In one example, device 140 may include a single antenna 147. In another example, device 140 may include two or more antennas 147.

Antennas 107 and/or 147 may include any type of antennas suitable for transmitting and/or receiving wireless communication signals, blocks, frames, transmission streams, packets, messages and/or data. For example, antennas 107 and/or 147 may include any suitable configuration, structure and/or arrangement of one or more antenna elements, components, units, assemblies and/or arrays. Antennas 107 and/or 147 may include, for example, antennas suitable for directional communication, e.g., using beamforming techniques. For example, antennas 107 and/or 147 may include a phased array antenna, a multiple element antenna, a set of switched beam antennas, and/or the like. In some embodiments, antennas 107 and/or 147 may implement transmit and receive functionalities using separate transmit and receive antenna elements. In some embodiments, antennas 107 and/or 147 may implement transmit and receive functionalities using common and/or integrated transmit/receive elements.

In some demonstrative embodiments, device 102 may include a controller 124, and/or device 140 may include a controller 154. Controller 124 and/or 154 may be configured to perform one or more communications, may generate and/or communicate one or more messages and/or transmissions, and/or may perform one or more functionalities, operations and/or procedures between devices 102, and/or 140 and/or one or more other devices, e.g., as described below.

In some demonstrative embodiments, controllers 124 and/or 154 may include circuitry and/or logic, e.g., one or more processors including circuitry and/or logic, memory circuitry and/or logic, Media-Access Control (MAC) circuitry and/or logic, Physical Layer (PHY) circuitry and/or logic, and/or any other circuitry and/or logic, configured to perform the functionality of controllers 124 and/or 154, respectively. Additionally or alternatively, one or more functionalities of controllers 124 and/or 154 may be implemented by logic, which may be executed by a machine and/or one or more processors, e.g., as described below.

In one example, controller 124 may include circuitry and/or logic, for example, one or more processors including circuitry and/or logic, to cause, trigger and/or control a wireless device, e.g., device 102, and/or a wireless station, e.g., a wireless STA implemented by device 102, to perform one or more operations, communications and/or functionalities, e.g., as described herein.

In one example, controller 154 may include circuitry and/or logic, for example, one or more processors including circuitry and/or logic, to cause, trigger and/or control a wireless device, e.g., device 140, and/or a wireless station, e.g., a wireless STA implemented by device 140, to perform one or more operations, communications and/or functionalities, e.g., as described herein.

In some demonstrative embodiments, device 102 may include a message processor 128 configured to generate, process and/or access one or messages communicated by device 102.

In one example, message processor 128 may be configured to generate one or more messages to be transmitted by device 102, and/or message processor 128 may be configured to access and/or to process one or more messages received by device 102, e.g., as described below.

In some demonstrative embodiments, device 140 may include a message processor 158 configured to generate, process and/or access one or messages communicated by device 140.

In one example, message processor 158 may be configured to generate one or more messages to be transmitted by device 140, and/or message processor 158 may be configured to access and/or to process one or more messages received by device 140, e.g., as described below.

In some demonstrative embodiments, message processors 128 and/or 158 may include circuitry and/or logic, e.g., one or more processors including circuitry and/or logic, memory circuitry and/or logic, Media-Access Control (MAC) circuitry and/or logic, Physical Layer (PHY) circuitry and/or logic, and/or any other circuitry and/or logic, configured to perform the functionality of message processors 128 and/or 158, respectively. Additionally or alternatively, one or more functionalities of message processors 128 and/or 158 may be implemented by logic, which may be executed by a machine and/or one or more processors, e.g., as described below.

In some demonstrative embodiments, at least part of the functionality of message processor 128 may be implemented as part of radio 114, and/or at least part of the functionality of message processor 158 may be implemented as part of radio 144.

In some demonstrative embodiments, at least part of the functionality of message processor 128 may be implemented as part of controller 124, and/or at least part of the functionality of message processor 158 may be implemented as part of controller 154.

In other embodiments, the functionality of message processor 128 may be implemented as part of any other element of device 102, and/or the functionality of message processor 158 may be implemented as part of any other element of device 140.

In some demonstrative embodiments, at least part of the functionality of controller 124 and/or message processor 128 may be implemented by an integrated circuit, for example, a chip, e.g., a System on Chip (SoC). In one example, the chip or SoC may be configured to perform one or more functionalities of radio 114. For example, the chip or SoC may include one or more elements of controller 124, one or more elements of message processor 128, and/or one or more elements of radio 114. In one example, controller 124, message processor 128, and radio 114 may be implemented as part of the chip or SoC.

In other embodiments, controller 124, message processor 128 and/or radio 114 may be implemented by one or more additional or alternative elements of device 102.

In some demonstrative embodiments, device 102 and/or device 140 may include a wearable device, a sensor, small device, a mobile device, and/or any other device, which may be, for example, powered by a battery and/or any other power source having a limited capacity.

In some demonstrative embodiments, device 102 and/or device 140 may support wireless communication technologies such as, for example, Wi-Fi, Bluetooth (BT), and/or any other additional or alternative technology, for example, to connect between device 102, device 140, and/or other wireless devices.

In some demonstrative embodiments, device 140 may include a wearable device and/or a sensor device powered by a power source having a limited capacity, e.g., a small battery.

In some demonstrative embodiments, device 140 may be configured to communicate data with another device, e.g., device 102, which may be less power constrained than device 140, for example, a Smartphone.

In some demonstrative embodiments, communicating data between device 102 and device 140 may consume power of the power source of device 140.

In some demonstrative embodiments, minimizing energy consumption of one or more communication blocks, modules and/or elements of device 140 may be beneficial, and in some cases, even critical, for example, in order to reduce and/or minimize power consumption of the power source of device 140.

In some demonstrative embodiments, power consumption of device 140 may be reduced, e.g., minimized, for example, by powering off one or more communication blocks, modules and/or elements of device 140, e.g., as much as possible, for example, while maintaining data transmission and/or reception capabilities of device 140, e.g., without substantially increasing latency and/or degrading quality of data communication.

In one example, one or more communication blocks, modules and/or elements of device 140 may be powered on and/or may be woken up, for example, only when there is data to transmit, and/or only when there is data to receive. According to this example, the one or more communication blocks, modules and/or elements of device 140 may be powered off and/or switched to a sleep mode, for example, for the rest of the time.

For example, one or more elements of radio 144 may be powered on and/or may be woken up, for example, only when device 140 has data to transmit, and/or only when device 140 has data to receive. According to this example, one or more elements of radio 144 may be powered off and/or switched to the sleep mode, for example, for the rest of the time.

In some demonstrative embodiments, device 140 may include a wakeup receiver 150 configured to power on and/or to wakeup radio 144 of device 140.

In some demonstrative embodiments, wakeup receiver 150 may wakeup radio 144, for example, based on a packet, e.g., a wakeup packet, received from another device, e.g., device 102, which is, for example, to transmit data to device 140.

In some demonstrative embodiments, wakeup receiver 150 may include a receiver 156 configured to receive the wakeup packet.

In some demonstrative embodiments, wakeup receiver 150 may include circuitry and/or logic configured to receive, decode, demodulate, and/or process the wakeup packet.

In some demonstrative embodiments, receiver 156 may include circuitry; logic; Radio Frequency (RF) elements, circuitry and/or logic; baseband elements, circuitry and/or logic; demodulation elements, circuitry and/or logic; amplifiers; analog to digital converters; filters; and/or the like.

In some demonstrative embodiments, wakeup receiver 150 may include a controller 159 configured to control one or more operations and/or functionalities of wakeup receiver 150, e.g., for processing the wakeup packet and/or waking up radio 144. For example, controller 159 may be configured to control a power supply of radio 144, and/or any other mechanism to wakeup radio 144, e.g., upon determining that a wakeup packet has been received by wakeup receiver 150.

In some demonstrative embodiments, controller 159 may be configured to perform one or more communications, to generate and/or communicate one or more messages and/or transmissions, and/or to perform one or more functionalities, operations and/or procedures, e.g., as described below.

In some demonstrative embodiments, controller 159 may include circuitry and/or logic, e.g., one or more processors including circuitry and/or logic, memory circuitry and/or logic, Media-Access Control (MAC) circuitry and/or logic, Physical Layer (PHY) circuitry and/or logic, and/or any other circuitry and/or logic, configured to perform the functionality of controller 159. Additionally or alternatively, one or more functionalities of controller 159 may be implemented by logic, which may be executed by a machine and/or one or more processors, e.g., as described below.

In one example, controller 159 may include circuitry and/or logic, for example, one or more processors including circuitry and/or logic, to cause a wireless device, e.g., device 140, and/or a wireless station, e.g., a wireless STA implemented by device 140, to perform one or more operations, communications and/or functionalities, e.g., as described herein.

In some demonstrative embodiments, wakeup receiver 150 may include a message processor 157 configured to process and/or access one or messages communicated by wakeup receiver 150.

In some demonstrative embodiments, message processor 157 may be configured to process one or more wakeup packets received by wakeup receiver 150, and/or to indicate to controller 159 that a wakeup packet is received.

In one example, message processor 157 may be configured to access, process, demodulate and/or decode reception of the wakeup packets by a wireless station, e.g., a wireless STA implemented by device 140.

In some demonstrative embodiments, message processor 157 may include circuitry and/or logic, e.g., one or more processors including circuitry and/or logic, memory circuitry and/or logic, Media-Access Control (MAC) circuitry and/or logic, Physical Layer (PHY) circuitry and/or logic, and/or any other circuitry and/or logic, configured to perform the functionality of message processor 157. Additionally or alternatively, one or more functionalities of message processor 157 may be implemented by logic, which may be executed by a machine and/or one or more processors, e.g., as described below.

In some demonstrative embodiments, at least part of the functionality of message processor 157 may be implemented as part of message processor 158.

In some demonstrative embodiments, at least part of the functionality of message processor 157 may be implemented as part of any other element of wakeup receiver 150. For example, at least part of the functionality of message processor 157 may be implemented as part of receiver 156 and/or controller 159.

In some demonstrative embodiments, at least part of the functionality of receiver 156, controller 159 and/or message processor 157 may be implemented by an integrated circuit, for example, a chip, e.g., a System on Chip (SoC). In one example, the chip or SoC may be configured to perform one or more functionalities of radio 144, controller 154 and/or message processor 158. For example, the chip or SoC may include one or more elements of controller 159, one or more elements of message processor 157, and/or one or more elements of receiver 156, one or more elements of radio 144, one or more elements of message processor 158, and/or one or more elements of controller 154. In one example, wakeup receiver 150, message processor 158, controller 154, and/or radio 144 may be implemented as part of the chip or SoC.

In other embodiments, radio 144, wakeup receiver 150, controller 154 and/or message processor 158 may be implemented by one or more additional or alternative elements of device 140. In one example, one or more elements of receiver 156 may be implemented as part of, and/or integrated as part of, receiver 146 and/or radio 144.

In some demonstrative embodiments, wakeup receiver 150 may be associated with one or more of antennas 147, e.g., which may be shared with radio 144.

In other embodiments, wakeup receiver 150 may include, or may be associated with, another, e.g., separate, antenna.

In some demonstrative embodiments, wakeup receiver 150 may be configured to wakeup radio 144, for example, if device 140 has data to transmit, and/or if data is to be received by radio 144.

In one example, wakeup receiver 150 may be configured to implement a low-power wakeup receiver (LP-WUR) scheme, for example, to wakeup radio 144, e.g., only when device 140 is to receive data and/or to transmit data.

In some demonstrative embodiments, the LP-WUR scheme, may introduce a power save mode ("LP-WUR mode"), for example, to an IEEE 802.11 Specification, e.g., as described below.

In some demonstrative embodiments, a device including an LP-WUR ("LP-WUR STA") may be configured to enter a mode ("LP-WUR mode"), e.g., in which the device is to turn off or power down a radio, e.g., an 802.11 radio, and operate the LP-WUR to wait for a wakeup packet.

In one example, device 140 including wakeup receiver 150 may be configured to enter the LP-WUR mode, in which the device 140 is to turn off or power down radio 144 radio and operate wakeup receiver 150 to wait for a wakeup packet.

In some demonstrative embodiments, wakeup receiver 150 may have, for example, a relatively low power consumption, e.g., less than 100 microwatts. Accordingly, the power consumption of device 140 may be reduced for example, during times when there is no data to be received at device 140 and only wakeup receiver 150 is on.

In some demonstrative embodiments, wakeup receiver 150 may wakeup radio 144, for example, based on a wakeup packet received from device 102.

In one example, receiver 156 may be configured to receive the wakeup packet from device 102, message processor 156 may be configured to process the wakeup packet, and/or controller 159 may be configured to wakeup radio 144.

In some demonstrative embodiments, device 102 may be configured to transmit the wakeup packet to device 140, for example, to indicate to wakeup receiver 150 that the radio 144 is to be woken up, e.g., to receive data from device 102.

In some demonstrative embodiments, controller 159 may be configured to cause radio 144 to wakeup, e.g., to switch to an active mode, for example, to receive data from device 102, e.g., subsequent to receiving the wakeup packet from device 102.

In some demonstrative embodiments, controller 159 may be configured to cause, control and/or trigger radio 144 to wakeup, e.g., to switch to an active mode, for example, to transmit data to device 102 and/or to another device.

In some demonstrative embodiments, devices 102 and/or 140 may be configured to communicate according to an Orthogonal Frequency-Division Multiplexing (OFDM) communication scheme, e.g., as described below.

For example, radio 114, radio 144 and/or wakeup receiver 150 may be configured to communicate according to the OFDM communication scheme.

In some demonstrative embodiments, devices 102 and/or 140 may be configured to communicate a wakeup packet over an Orthogonal Frequency Multiple Access (OFDMA) channel, e.g., as described below.

In some demonstrative embodiments, communication over the OFDMA channel may be performed in accordance with an IEEE 802.11 Specification, for example, an IEEE 802.11ax Specification, and/or any other specification and/or protocol.

In some demonstrative embodiments, an OFDMA communication scheme may be configured, for example, to increase and/or improve spectrum efficiency, e.g., in dense environments, for example, compared to non-OFDMA schemes, e.g., in accordance with IEEE 802.11ac and/or IEEE 802.11ah Standards, for example, compared to the OFDM scheme.

In some demonstrative embodiments, device 102 and/or device 140 may be configured to implement a transceiver structure for an LP-WUR, which may be, for example, compatible with the OFDMA communication scheme, e.g., in accordance with an IEEE 802.11ax Specification.

For example, radio 114, radio 144 and/or wakeup receiver 150 may be configured to communicate according to the OFDMA communications scheme.

In some demonstrative embodiments, device 102 and/or device 140 may be configured to communicate according to an OFDMA scheme, in which a STA, e.g., each STA, may be allocated a portion of an OFDMA channel bandwidth ("OFDMA sub-channel"), e.g., compared to the OFDM scheme, in which each STA may be allocated the entire channel bandwidth.

In some demonstrative embodiments, the OFDMA sub channel (also referred to as "sub band") may include a set of OFDMA sub-carriers (also referred to as "tones").

In some demonstrative embodiments, device 102 may be configured to transmit in an OFDMA sub-channel a wakeup packet to one or more other devices, ("LP-WUR devices"), which may be equipped with a LP-WUR.

In some demonstrative embodiments, device 140 may be configured to receive and process the wakeup packet in an OFDMA sub-channel.

In some demonstrative embodiments, device 102 may be configured to allocate an OFDMA sub-channel (also referred to as "Resource Unit (RU)"), for example, to communicate the wakeup packet.

In some demonstrative embodiments, a dedicated OFDMA sub-band (also referred to as "the wakeup RU allocation") may be used for a wakeup packet transmission, for example, such that the wakeup packet may be transmitted, for example, simultaneously with other downlink (DL) traffic, thus fully benefiting from OFDMA, and/or enhancing spectrum efficiency, e.g., as described below.

In some demonstrative embodiments, communicating the wakeup packet over the OFDMA RU allocation may enable, for example, to communicate the wakeup packet, for example, without occupying an entire channel bandwidth.

In some demonstrative embodiments, communicating the wakeup packet over the OFDMA RU may enable, for example, to multiplex in the frequency-domain packets communicated between a plurality of different STAs.

In some demonstrative embodiments, communicating the wake-up packet over an OFDMA RU allocation may enable, for example, to increase and/or improve spectrum efficiency.

In some demonstrative embodiments, an OFDMA structure may use a waveform having a symbol duration, for example, a duration of 12.8 microseconds (μs), e.g., in addition to a duration of a guard interval, and/or any other duration.

In some demonstrative embodiments, the symbol duration of the OFDMA structure may be, for example, four times longer than a waveform of an OFDM structure, for example, a High Throughput (HT) waveform, a Very High Throughput (VHT) waveform, or a non-HT waveform, e.g., in accordance with an existing 802.11 specification.

In some demonstrative embodiments, the longer symbol duration of the OFDMA structure may enable using an increased number of tones, for example, Fast Fourier Transform (FFT) tones, e.g., four times the FFT tones of an OFDM structure.

In some demonstrative embodiments, the increased number of tones may enable, for example, multiplexing more users in the frequency domain across the band, e.g., using the OFDMA structure.

Figure 2:
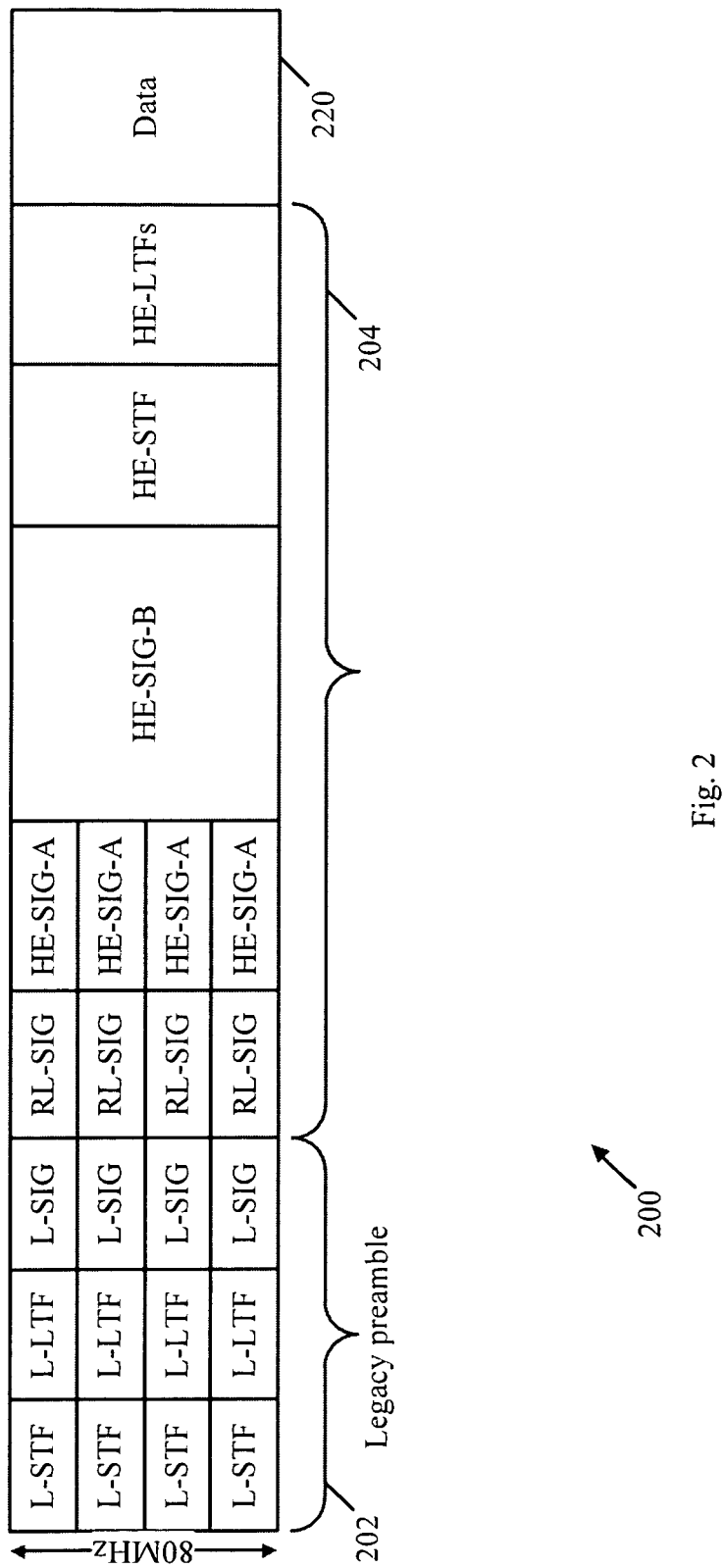
FIG. 2 is a schematic illustration of a downlink (DL) frame structure, in accordance with some demonstrative embodiments.

Reference is made to FIG. 2, which schematically illustrates a downlink (DL) frame structure 200, in accordance with some demonstrative embodiments.

In some demonstrative embodiments, DL frame structure 200 may be in accordance with an IEEE Specification, e.g., an IEEE 802.11ax Specification.

In some demonstrative embodiments, DL frame structure 200 may be implemented, for example, in an 80 Megahertz (MHz) bandwidth of operation.

In some demonstrative embodiments, DL frame structure 200 may include a legacy preamble 202.

In some demonstrative embodiments, DL frame structure 200 may include a preamble, for example, a High Efficiency (HE) preamble 204, e.g., configured for OFDMA.

In some demonstrative embodiments, DL frame structure 200 may include a data portion 220.

In some demonstrative embodiments, data portion 220 may be configured in accordance with an OFDMA structure, e.g., as described below.

In some demonstrative embodiments, data portion 220 may enable to assign users with bandwidths from as small as approximately 2 MHz or more, for example approximately 2.6 MHz, e.g., corresponding to 26 OFDMA tones, to larger units of approximately 4 MHz, e.g., corresponding to 52 OFDMA tones, 106-tones, 242-tones, 484-tones, 996-tones, and/or any other number of tones, for example, to fill up a full bandwidth, e.g., a 20 MHz bandwidth, a 40 MHz bandwidth, a 80 MHz bandwidth, or a 160 MHz bandwidth, of a Basic Service Set (BSS) channel.

In some demonstrative embodiments, a wakeup RU allocation may include at least one OFDMA RU allocation, which may be dedicated and/or scheduled, for example, for wakeup packet communication.

In some demonstrative embodiments, at least one OFDMA RU ("the wake-up RU") within the OFDMA structure of the data portion 220 may be allocated to communicate a wakeup packet, e.g., as described below.

Referring back to FIG. 1, in some demonstrative embodiments, device 102 may generate a wakeup packet configured to wakeup receiver 146 of device 140.

In some demonstrative embodiments, controller 124 may be configured to cause, control and/or trigger message processor 128 to generate the wakeup packet.

In some demonstrative embodiments, controller 124 may be configured to cause, control and/or trigger device 102 to transmit the wakeup packet over a wakeup resource unit of an OFDMA structure.

In one example, controller 124 may be configured to cause, control and/or trigger transmitter 118 to transmit the wakeup packet over a wakeup RU of an OFDMA structure of data portion 220 (FIG. 2).

In some demonstrative embodiments, controller 124 may be configured to cause, control and/or trigger device 102 to allocate at least one OFDMA RU, for example, to be used as the wakeup RU allocation for the transmission of the wakeup packet, e.g., instead of data packets, e.g., a data packet according to an IEEE 802.11ax Specification.

In some demonstrative embodiments, the OFDMA structure may include a plurality of RUs allocated for data transmission.

In some demonstrative embodiments, the wakeup RU allocation may include at least one dedicated RU not allocated for the data transmission, e.g., as described below.

In some demonstrative embodiments, controller 124 may be configured to cause, control and/or trigger device 102 to transmit the wakeup packet over the wakeup RU allocation of the OFDMA structure.

In some demonstrative embodiments, controller 154 and/or controller 159 may be configured to cause, control and/or trigger device 140 to process the wakeup packet received from device 102 over the wakeup RU allocation of the OFDM structure.

In some demonstrative embodiments, controller 154 and/or controller 159 may be configured to cause, control and/or trigger device 140 to monitor the wakeup RU allocation, for example, to detect the wakeup packet from device 102.

In some demonstrative embodiments, controller 154 and/or controller 159 may be configured to cause, control and/or trigger device 140 to wakeup receiver 146, for example, to receive from device 102 one or more data packets, e.g., one or more OFDMA data packets, for example, over one or more RUs of the plurality of RUs allocated for data transmission according to the OFDMA structure. Additionally or alternatively, controller 154 and/or controller 159 may be configured to cause, control and/or trigger device 140 to wakeup receiver 146, for example, to receive from device 102 one or more data packets, e.g., one or more non-OFDMA packets, for example, over the entire bandwidth.

In some demonstrative embodiments, the OFDMA structure may include one or more RUs, which are not allocated for data transmission, separating the dedicated wake-up RU from the plurality of RUs allocated for data transmission.

In some demonstrative embodiments, device 102 may be configured to leave the OFDMA sub-channels that are adjacent to the wakeup RU allocation, e.g., on one or both sides, blank, for example, to avoid adjacent interference to the LP-WUR.

For example, an RU that is adjacent to a wakeup RU allocation may not be assigned to a data transmission, e.g., any normal .11ax data transmission.

In some demonstrative embodiments, the wakeup RU allocation may include at least one central RU on both sides of a Direct Current (DC) tone, e.g., as described below.

In some demonstrative embodiments, the wakeup RU allocation may include at least one 26-tone RU, e.g., as described below.

In some demonstrative embodiments, the wakeup RU allocation may include a combination of at least two RUs (also referred to as "a combined RU"), for example, a combination of two 26-tone RUs (also referred to as "a combined 26-tone RU"), e.g., as described below.

In some demonstrative embodiments, the wakeup RU allocation may include at least one 52-tone RU, e.g., as described below.

In some demonstrative embodiments, the wake-up RU allocation, e.g., the 26-tone wakeup RU allocation, the 52-tone wakeup RU allocation, and/or the combined 26-tone wakeup RU allocation, may be configured to communicate a wakeup signal having a predefined signal bandwidth, for example, approximately at least 2 MHz or 4 MHz or any other signal bandwidth, which may occupy the wakeup RU allocation.

In some demonstrative embodiments, the wakeup packet may be transmitted in a compressed format, for example, to shorten the duration of the wakeup packet.

In some demonstrative embodiments, the wakeup packet may be configured to have a symbol duration, which may be less than an OFDMA signal duration.

In one example, the wakeup packet may have a symbol duration, e.g., similar to a symbol duration of a legacy IEEE 802.11x symbol duration.

Figure 3:
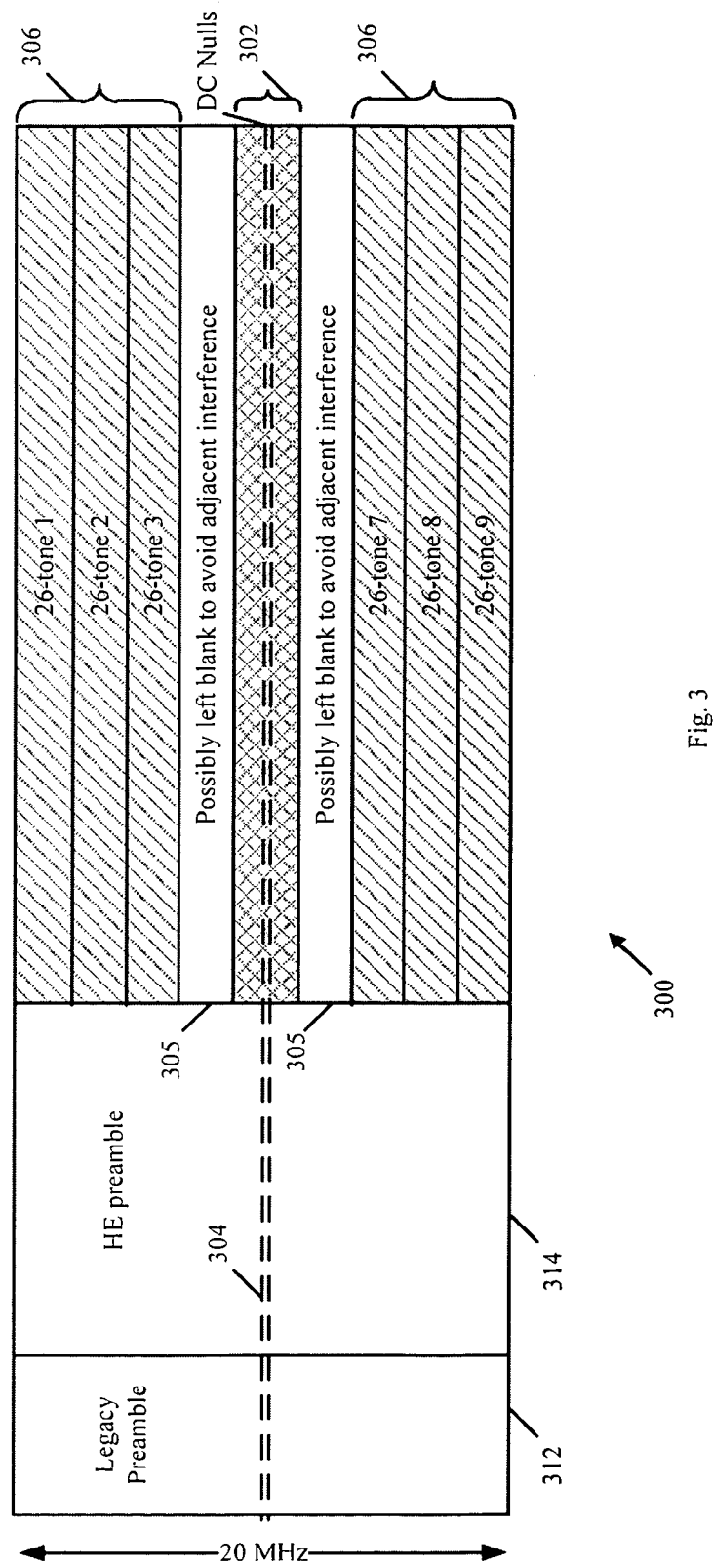
FIG. 3 is a schematic illustration of an Orthogonal Frequency Division Multiple Access (OFDMA) structure, in accordance with some demonstrative embodiments.

Reference is made to FIG. 3, which schematically illustrates an OFDMA DL structure 300, in accordance with some demonstrative embodiments.

In some demonstrative embodiments, OFDMA DL structure 300 may be, for example, in accordance with an IEEE 802.11ax OFDMA DL transmission scheme.

In some demonstrative embodiments, OFDMA DL structure 300 may be used for transmission of a wakeup packet.

In some demonstrative embodiments, OFDMA DL structure 300 may be implemented, for example, with a central 26-tone wakeup RU allocation in a 20 MHz OFDMA BSS, which may be scheduled for transmission of a wake-up packet, e.g., as described below.

In one example, devices 102 and 140 (FIG. 1) may communicate the wakeup packet transmission, for example, according to OFDMA DL structure 300.

In some demonstrative embodiments, as shown in FIG. 3, OFDMA DL structure 300 may include a legacy preamble 312. For example, legacy preamble 312 may include legacy preamble 202 (FIG. 2).

In some demonstrative embodiments, as shown in FIG. 3, OFDMA DL structure 300 may include an HE preamble 314. For example, HE preamble 314 may include HE preamble 204 (FIG. 2).

In some demonstrative embodiments, as shown in FIG. 3, one or more sub-bands 302, which may be, for example, located at the center of OFDMA DL structure 300, e.g., around Direct Current (DC) tones 304, may be allocated for the wakeup packet transmission.

In some demonstrative embodiments, as shown in FIG. 3, one or more sub-bands 306, e.g., one or more of the remaining sub-bands of OFDMA DL structure 300, may be used for data packet transmissions, e.g., for one or more other users.

In some demonstrative embodiments, as shown in FIG. 3, at least two sub-channels 305, e.g., adjacent to the one or more sub-bands 302, may, optionally, not be assigned to any transmission, e.g., to avoid adjacent interference, for example, between a wakeup transmission, e.g., over sub-bands 302, and data packet transmissions, e.g., over sub-bands 306.

Figure 4:
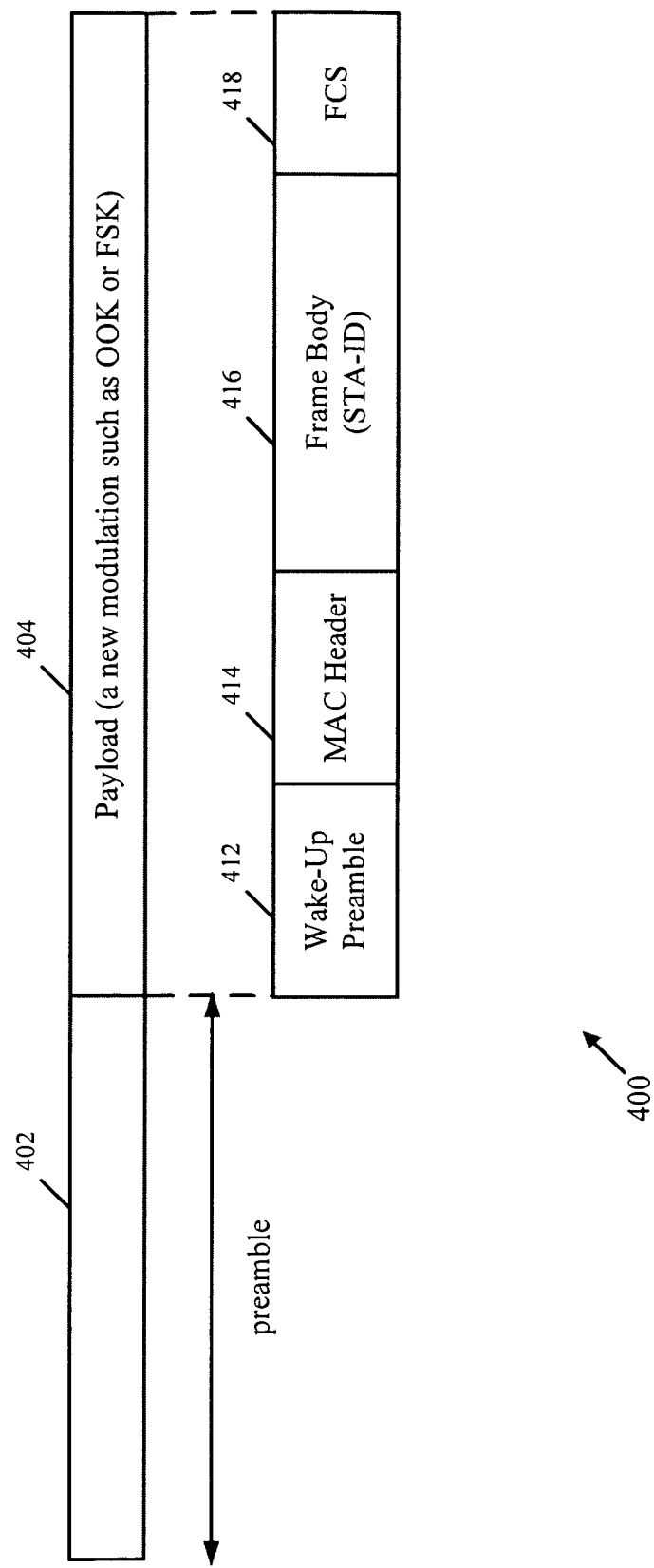
FIG. 4 is a schematic illustration of a structure of a wakeup packet, in accordance with some demonstrative embodiments.

Reference is made to FIG. 4, which schematically illustrates a structure of a wakeup packet 400, in accordance with some demonstrative embodiments.

For example, device 102 (FIG. 1) may be configured to generate and/or transmit wakeup packet 400, and/or device 140 (FIG. 1) may be configured to process wakeup packet 400.

In some demonstrative embodiments, a device, e.g., device 102 (FIG. 1) may be configured to transmit wakeup packet 400, for example, as part of an OFDM data portion of a frame structure, e.g., data portion 220 (FIG. 1) of frame structure 200 (FIG. 1).

In some demonstrative embodiments, a device, e.g., device 102 (FIG. 1) may be configured to transmit wakeup packet 400, for example, over one or more RUs of an OFDMA structure, e.g., over sub-bands 302 (FIG. 3), which may be allocated for transmission of wakeup packet 400.

In some demonstrative embodiments, as shown in FIG. 4, wakeup packet 400 may include a preamble 402, for example, in accordance with a preamble structure defined by the IEEE 802.11ax Specification, e.g., or any other preamble.

In some demonstrative embodiments, as shown in FIG. 4, wakeup packet 400 may include a payload 404.

In some demonstrative embodiments, payload 404 may be modulated by a simple modulation scheme, for example, an On-off Keying (OOK) modulation scheme.

Some demonstrative embodiments are described herein with respect to an OOK modulation scheme. However, in other embodiments wakeup packet 400 may include a payload 404 modulated according to any other Amplitude-Shift Keying (ASK) modulation scheme, a Frequency Shift Keying (FSK) modulation scheme, and/or any other modulation scheme.

In some demonstrative embodiments, payload 404 may include an OOK modulated wakeup packet preamble 412.

In some demonstrative embodiments, as shown in FIG. 4, payload 404 may include a Media Access Control (MAC) header 414.

In some demonstrative embodiments, as shown in FIG. 4, payload 404 may include a frame body field 416.

In some demonstrative embodiments, as shown in FIG. 4, payload 404 may include a Frame Check Sequence (FCS) field 418, for example, including a Cyclic Redundancy Check (CRC) value, e.g. a CRC-8 value or a CRC-16 value, for example, of MAC Header field 414 and the Frame Body field 416.

Referring back to FIG. 1, in some demonstrative embodiments, device 140 may be configured to determine the exact location of a wakeup RU allocation, e.g., assigned to device 140, for example, via prior information exchange, e.g., as part of an a priori handshake and/or as part of any other mechanism.

For example, the wakeup RU allocation may be indicated or signaled to device 140, for example, by a scheduler of the OFDMA structure, e.g., device 102, and/or any other device of system 100.

In some demonstrative embodiments, device 102 may send an indication of the wakeup RU allocation, e.g., to device 140.

In some demonstrative embodiments, controller 124 may be configured to cause, control and/or trigger transmitter 118 to transmit a message including an indication of the wakeup RU allocation.

In one example, the message may indicate an assignment of an RU for the transmission of the wakeup packet.

In some demonstrative embodiments, device 140 may receive the message from device 102.

In some demonstrative embodiments, controller 154 and/or controller 159 may be configured to cause, control and/or trigger device 140 to process reception of the message including the indication of the wakeup RU allocation, for example, before reception of the wakeup packet.

In some demonstrative embodiments, controller 154 and/or controller 159 may be configured to cause, control and/or trigger device 140 to monitor the wakeup RU allocation for the wakeup packet, for example, based on the message.

In one example, wakeup receiver 150 may be configured to monitor only a wakeup preamble of a packet over the wakeup RU allocation, and/or to skip processing and/or to ignore any other data blocks of the packet.

In one example, receiver 144 may be configured to detect an incoming OFDMA packet, for example, an IEEE 802.11ax OFDMA packet, e.g., using an IEEE 802.11ax classification technique that is known to it.

In some demonstrative embodiments, after decoding HE-SIG fields, e.g., HE-SIG fields of HE preamble 314 (FIG. 3), receiver 144 may determine if there is an OFDMA assignment for receiver 144 in one or more of the RUs allocated for data transmission, e.g., RU numbers 1, 2, 3, 7, 8 and 9 of sub bands 306 (FIG. 3).

In some demonstrative embodiments, the central 26-tone, e.g., sub-bands 302 (FIG. 3), may be dedicated to wakeup packet transmission, and, accordingly, receiver 144 may not decode the central allocations of sub-bands 302.

In some demonstrative embodiments, wakeup receiver 150 may be tuned to the center of the band, and may use, for example, narrow band filtering, e.g., to detect, filter, select and/or to process the wakeup RU allocation.

In some demonstrative embodiments, wakeup receiver 150 may detect the Wake-Up Preamble, e.g., wakeup preamble 412 (FIG. 4), and may proceed to decode the entire wakeup packet, e.g., payload 404 (FIG. 4).

In some demonstrative embodiments, a size and/or location of the wakeup RU allocation may be based, for example, on a bandwidth of the OFDMA structure, e.g., as described below.

Figure 5:
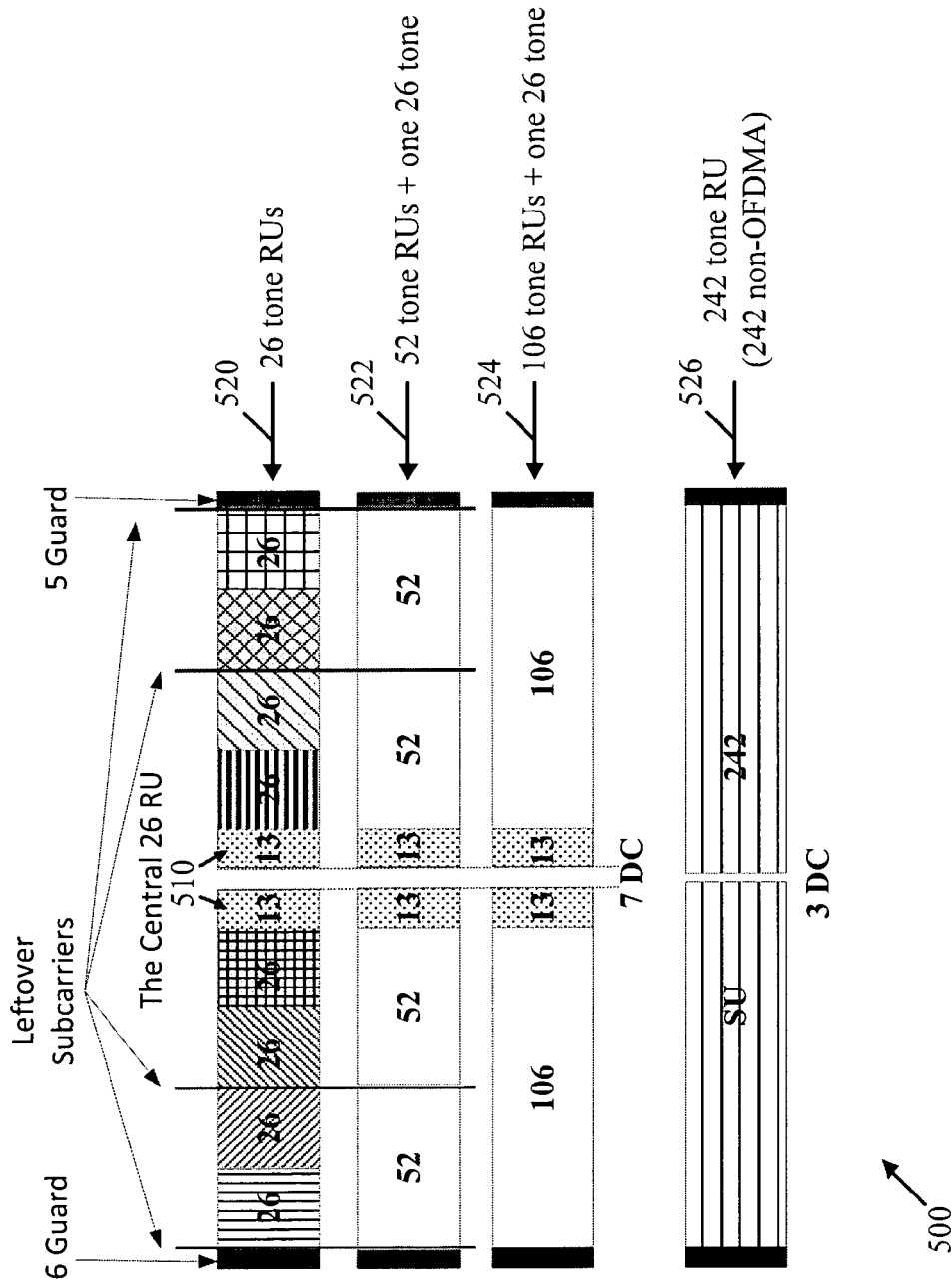
FIG. 5 is a schematic illustration of an Orthogonal Frequency Division Multiple Access (OFDMA) structure, in accordance with some demonstrative embodiments.

Reference is made to FIG. 5, which schematically illustrates an OFDMA structure 500, in accordance with some demonstrative embodiments.

As shown in FIG. 5, OFDMA structure 500 may be configured for communication over the 20 MHz BW, e.g., in a 20 MHZ BSS. For example, devices 102 (FIG. 1) and/or 140 (FIG. 1) may be configured to communicate according to OFDMA structure 500.

In one example, device 102 (FIG. 1) may transmit the wakeup packet, e.g., wakeup packet 400 (FIG. 4), over a wakeup RU allocation of OFDMA structure 500, e.g., as described below.

As shown in FIG. 5, OFDMA structure 500 may include 9 allocations of 26-tones, 4 allocations of 52-tones, or any other suitable combination of 26-tone and/or 52-tone allocations.

In some demonstrative embodiments, as shown in FIG. 5, OFDMA structure 500 may include a plurality of RU allocation schemes, including, for example, an allocation scheme 520 including nine 26-tone RUs; an allocation scheme 522 including four 52-tone RUs and one 26-tone RU; an allocation scheme 524 including two 106-tone RUs and one 26-tone RU; and an allocation scheme 526 including one 242-tone RU, e.g., a non-OFDMA allocation.

In some demonstrative embodiments, at least one RU, e.g., a 26-tone RU, of the RUs of OFDMA structure 500 may be allocated as a wakeup RU, e.g., as described below.

In some demonstrative embodiments, as shown in FIG. 5, a central 26-tone RU 510 may be allocated to be used for transmission of the wakeup packet, e.g., wakeup packet 400 (FIG. 4).

In other embodiments, any other 26-tone allocation, e.g., of the 9 allocations of 26-tones, may be allocated to be used for the transmission of the wakeup packet, e.g., wakeup packet 400 (FIG. 4).

In some demonstrative embodiments, as shown in FIG. 5, the central 26-tone RU 510 may be on both sides of a DC tone, e.g., around 7 DC Nulls.

In some demonstrative embodiments, the wake-up packet may be modulated with a non-OFDM modulation scheme, for example, a simple modulation scheme, e.g., an On-off Keying (OOK) modulation scheme as described above. According tot these embodiments, the wakeup packet may not require using a large number of DC nulls. Accordingly, the wake-up packet may utilize one or more of the DC nulls, e.g., leaving three DC nulls or any other number of nulls.

Figure 6:
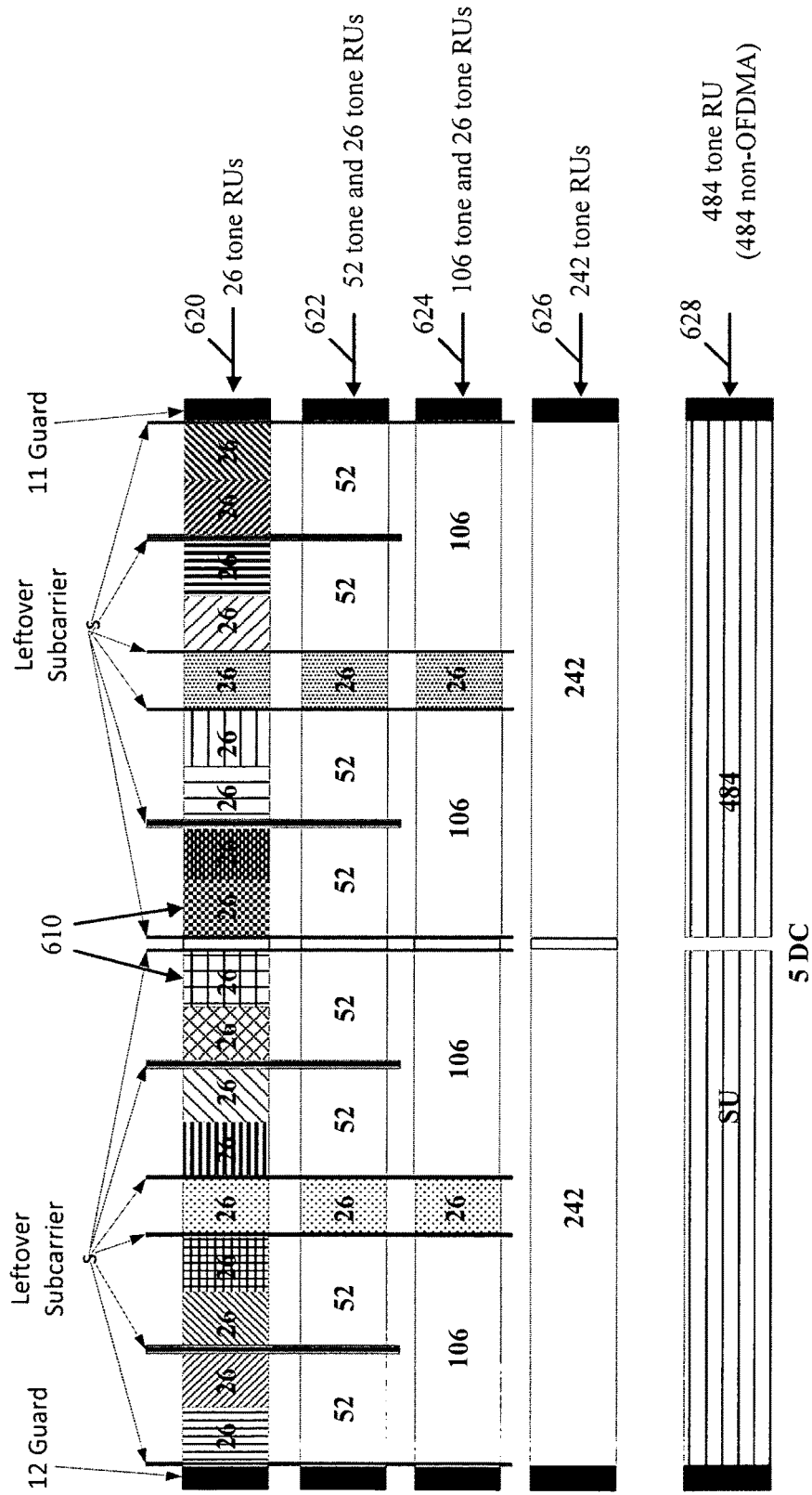
FIG. 6 is a schematic illustration of an OFDMA structure, in accordance with some demonstrative embodiments.

Reference is made to FIG. 6, which schematically illustrates an OFDMA structure 600, in accordance with some demonstrative embodiments.

As shown in FIG. 6, OFDMA structure 600 may be configured for communication over the 40 MHz BW, e.g., in a 40 MHZ BSS. For example, devices 102 (FIG. 1) and/or 140 (FIG. 1) may be configured to communicate according to OFDMA structure 600.

In one example, device 102 (FIG. 1) may transmit the wakeup packet, e.g., wakeup packet 400 (FIG. 4), over a wakeup RU allocation of OFDMA structure 600, e.g., as described below.

As shown in FIG. 6, OFDMA structure 600 may include 18 allocations of 26-tones, 8 allocations of 52-tones, or any other suitable combination of 26-tone and/or 52-tone allocations.

In some demonstrative embodiments, as shown in FIG. 6, OFDMA structure 600 may include a plurality of RU allocation schemes, including, for example, an allocation scheme 620 including 18 26-tone RUs; an allocation scheme 622 including 8 52-tone RUs and two 26-tone RU; an allocation scheme 624 including four 106-tone RUs and two 26-tone RU; an allocation scheme 626 including two 242-tone RUs; and an allocation scheme 628 including one 484-tone allocation e.g., a non-OFDMA allocation.

In some demonstrative embodiments, at least one RU, e.g., a 52-tone RU or a 26-tone RU, of the RUs of OFDMA structure 600 may be allocated as a wakeup RU, e.g., as described below.

In some demonstrative embodiments, as shown in FIG. 6, a combined RU 610, e.g., including a combination of two central 26-tone RUs, may be allocated to be used for transmission of the wakeup packet, e.g., wakeup packet 400 (FIG. 4).

In other embodiments, any other 52-tone allocation, e.g., of the 8 allocations of 52-tones, may be allocated to be used for the transmission of the wakeup packet, e.g., wakeup packet 400 (FIG. 4).

In some demonstrative embodiments, as shown in FIG. 6, the combined RU 610 may be on both sides of a DC tone, e.g., around 5 DC Nulls, or any other of DC nulls, e.g., three DC nulls as described above with reference to FIG. 5.

In some demonstrative embodiments, the wakeup packet, e.g., wakeup packet 400 (FIG. 4), may occupy only a portion, e.g., a central portion, of the combination of the combined RU 610, for example, leaving possibly some tones on one or both sides of RU 610, which may be, for example, used as null tones, e.g., to serve as a guard interval between the wakeup RU allocation and OFDMA data transmissions.

Figure 7:
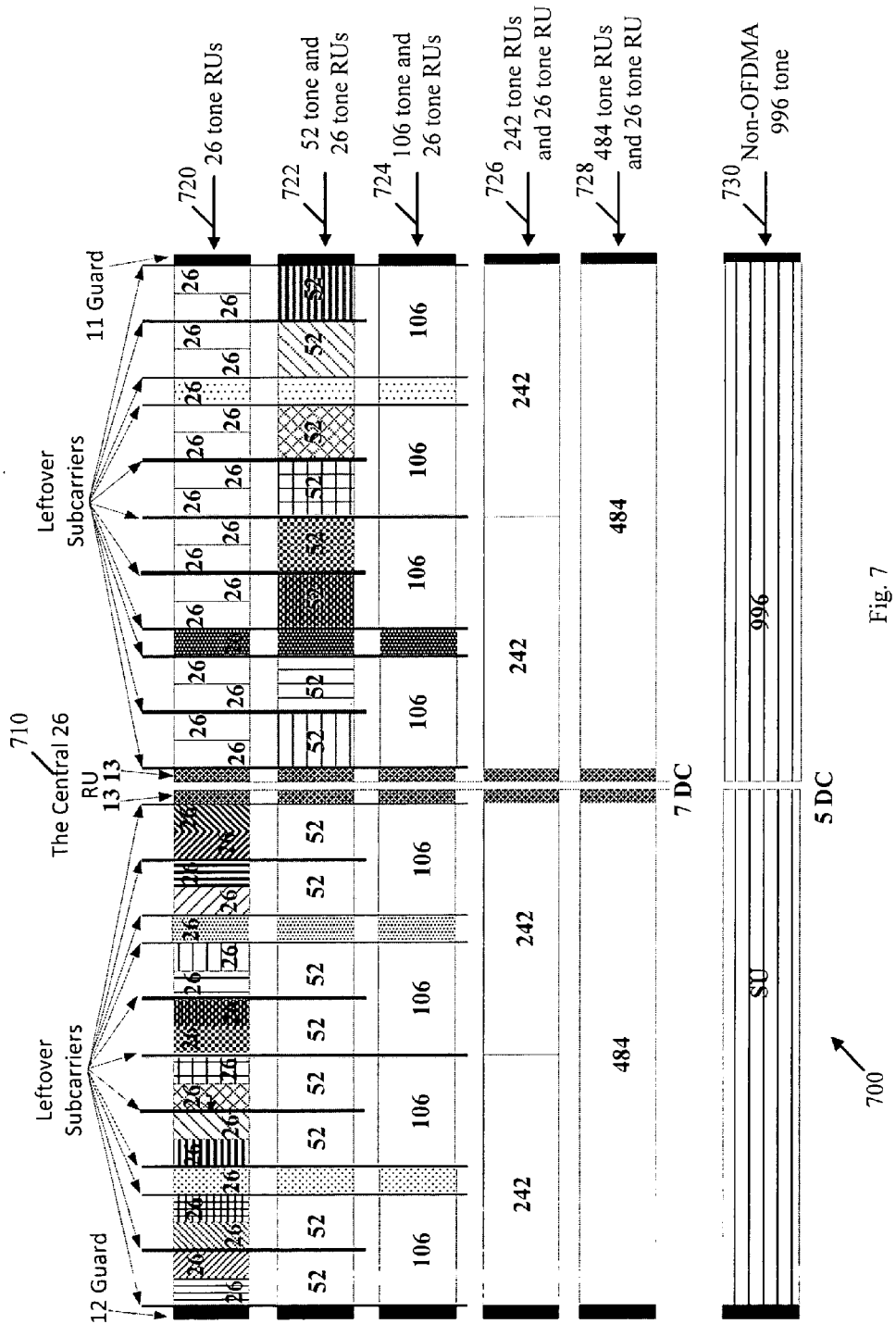
FIG. 7 is a schematic illustration of an OFDMA structure, in accordance with some demonstrative embodiments.

Reference is made to FIG. 7, which schematically illustrates an OFDMA structure 700, in accordance with some demonstrative embodiments.

As shown in FIG. 7, OFDMA structure 700 may be configured to communicate over the 80 MHz BW, e.g., in a 80 MHZ BSS. For example, devices 102 (FIG. 1) and/or 140 (FIG. 1) may be configured to communicate according to OFDMA structure 700.

In one example, device 102 (FIG. 1) may transmit the wakeup packet, e.g., wakeup packet 400 (FIG. 4), over a wakeup RU allocation of OFDMA structure 700, e.g., as described below.

As shown in FIG. 7, OFDMA structure 700 may include 37 allocations of 26-tones, 16 allocations of 52-tones, or any other suitable combination of 26-tones and/or 52-tones.

In some demonstrative embodiments, as shown in FIG. 7, OFDMA structure 700 may include a plurality of RU allocation schemes, including, for example, an allocation scheme 720 including 37 26-tone RUs; an allocation scheme 722 including 16 52-tone RUs and four 26-tone RU; an allocation scheme 724 including 8 106-tone RUs and four 26-tone RU; an allocation scheme 726 including four 242-tone RUs; an allocation scheme 728 including two 484-tone RUs; and an allocation scheme 730 including one 996-tone allocation e.g., a non-OFDMA allocation.

In some demonstrative embodiments, at least one RU, e.g., a 52-tone RU or a 26-tone RU, of the RUs of OFDMA structure 700 may be allocated as a wakeup RU, e.g., as described below.

In some demonstrative embodiments, as shown in FIG. 7, a central 26-tone RU 710 may be allocated to be used for transmission of the wakeup packet, e.g., wakeup packet 400 (FIG. 4).

In other embodiments, any other 26-tone allocation, e.g., of the 37 allocations of 26-tones, may be allocated to be used for the transmission of the wakeup packet, e.g., wakeup packet 400 (FIG. 4).

In some demonstrative embodiments, as shown in FIG. 7, the central 26-tone RU 710 may be on both sides of a DC tone, e.g., around 7 DC Nulls, or any other of DC nulls, e.g., three DC nulls as described above with reference to FIG. 5.

In some demonstrative embodiments, in a wider BW, for example, in a 160 MHz BSS, a combination of two 26-tone allocations around the DC tone may be allocated to be used for transmission of the wakeup packet. For example, the 160 MHz BSS may include two replicas of the 80 MHz BSS.

In some demonstrative embodiments, communication of the wakeup packet over the wider BW, e.g., the 160 MHz BSS, may occupy, for example, only part of, e.g., only a central portion of, the combination of the two 26-tone allocations around the DC tone, for example, leaving possibly some tones on one or both sides as null tones, e.g., to serve as a guard between the wakeup RU allocation and OFDMA data transmission.

In some demonstrative embodiments, the wakeup packet may occupy only a portion, e.g., a central portion, of the combination of the two central 26-tone RU, leaving possibly some tones on one or both sides of two central 26-tone RU to be used as null tones, e.g., to serve as a guard interval between the wakeup RU allocation and OFDMA data transmission.

In some demonstrative embodiments, any other RU allocation, for example, a 26-tone RU, a 52-tone RU, a combination of two adjacent 26-tone RUs, and/or any other one or more RUs of any other size, for example, of the OFDMA structure 500 (FIG. 5), the OFDMA structure 600 (FIG. 6), and/or the OFDMA structure 700 (FIG. 7), may be allocated as at least one wakeup RU allocation, e.g., a 26-tone wakeup RU allocation, a 52-tone wakeup RU allocation, a combined 26-tones wakeup RU allocation, and/or any other allocation of one or more RUs.

Figure 8:
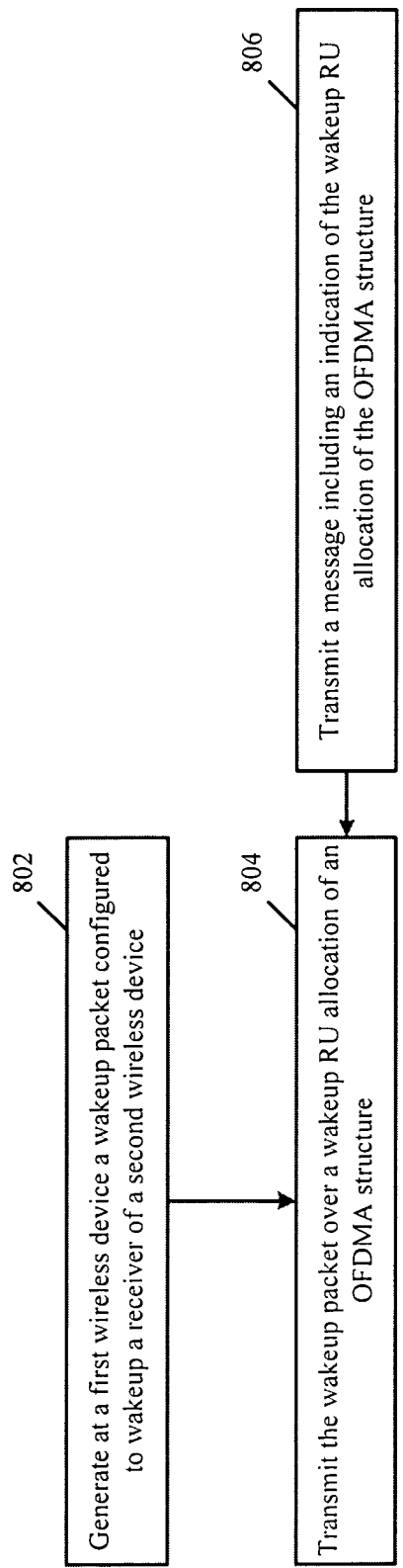
FIG. 8 is a schematic flow-chart illustration of a method of transmitting a wakeup packet, in accordance with some demonstrative embodiments.

Reference is made to FIG. 8, which schematically illustrates a method of transmitting a wakeup packet, in accordance with some demonstrative embodiments. For example, one or more of the operations of the method of FIG. 8 may be performed by one or more elements of a system, e.g., system 100 (FIG. 1), for example, one or more wireless devices, e.g., device 102 (FIG. 1), and/or device 140 (FIG. 1); a controller, e.g., controller 159 (FIG. 1), controller 124 (FIG. 1) and/or controller 154 (FIG. 1); a radio, e.g., radio 114 (FIG. 1) and/or radio 144 (FIG. 1); a transmitter, e.g., transmitter 118 and/or transmitter 148 (FIG. 1); a receiver e.g., receiver 116, receiver 156 and/or receiver 146 (FIG. 1); a wakeup receiver, e.g., wakeup receiver 150 (FIG. 1); and/or a message processor, e.g., message processor 157 (FIG. 1), message processor 128 (FIG. 1) and/or message processor 158 (FIG. 1).

As indicated at block 802, the method may include generating at a first wireless device a wakeup packet configured to wake up a receiver of a second wireless device. For example, controller 124 (FIG. 1) may control, cause and/or trigger message processor 128 (FIG. 1) and/or radio 114 (FIG. 1) to generate the wakeup packet configured to wakeup receiver 146 (FIG. 1) of device 140 (FIG. 1), e.g., as described above.

As indicated at block 804, the method may include transmitting the wakeup packet over a wakeup RU allocation of an OFDMA structure. For example, controller 124 (FIG. 1) may control, cause and/or trigger radio 114 (FIG. 1) to transmit the wakeup packet over a wakeup RU allocation of an OFDMA structure, e.g., as described above.

As indicated at block 806, in some demonstrative embodiments, the method may include transmitting a message including an indication of the wakeup RU allocation of the OFDMA structure, e.g., before transmitting the wakeup packet. For example, controller 124 (FIG. 1) may control, cause and/or trigger radio 114 (FIG. 1) to transmit the message including the indication of the wakeup RU allocation, e.g., as described above. In other embodiments, the message including the indication of the wakeup RU allocation may not be transmitted, for example, if the wakeup RU allocation is preconfigured and/or predefined, e.g., as described above.

Figure 9:
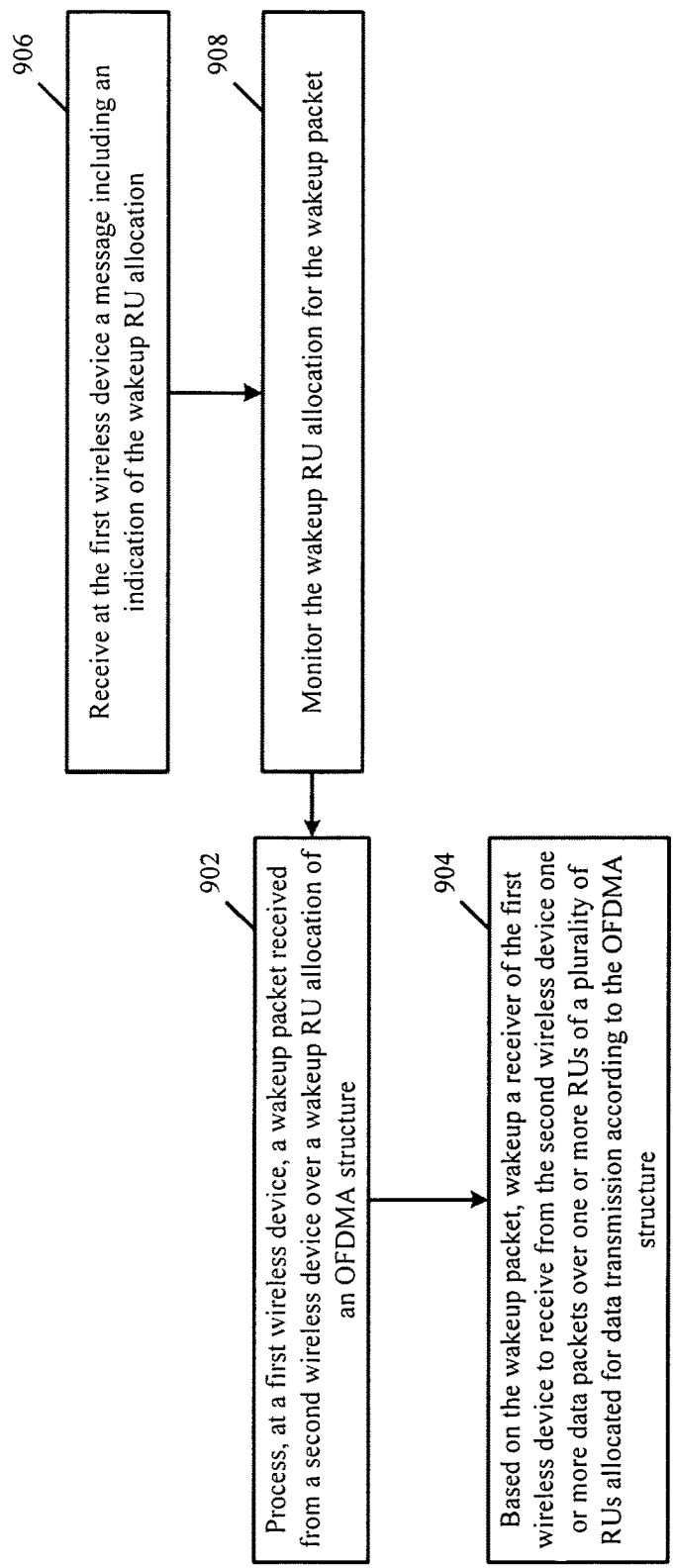
FIG. 9 is a schematic flow-chart illustration of a method of processing a received wakeup packet, in accordance with some demonstrative embodiments.

Reference is made to FIG. 9, which schematically illustrates a method of processing a wakeup packet, in accordance with some demonstrative embodiments. For example, one or more of the operations of the method of FIG. 9 may be performed by one or more elements of a system, e.g., system 100 (FIG. 1), for example, one or more wireless devices, e.g., device 102 (FIG. 1), and/or device 140 (FIG. 1); a controller, e.g., controller 159 (FIG. 1), controller 124 (FIG. 1) and/or controller 154 (FIG. 1); a radio, e.g., radio 114 (FIG. 1) and/or radio 144 (FIG. 1); a transmitter, e.g., transmitter 118 and/or transmitter 148 (FIG. 1); a receiver e.g., receiver 116, receiver 156 and/or receiver 146 (FIG. 1); a wakeup receiver, e.g., wakeup receiver 150 (FIG. 1); and/or a message processor, e.g., message processor 157 (FIG. 1), message processor 128 (FIG. 1) and/or message processor 158 (FIG. 1).

As indicated at block 902, the method may include processing, at a first wireless device, a wakeup packet received from a second wireless device over a wakeup RU allocation of an OFDMA structure. For example, controllers 159 and/or 154 (FIG. 1) may control, cause and/or trigger device 140 (FIG. 1) to process a wakeup packet received from device 102 (FIG. 1) over a wakeup RU allocation of an OFDMA structure, e.g., as described above.

As indicated at block 904, the method may include, based on the wakeup packet, waking up a receiver of the first wireless device to receive from the second wireless device one or more data packets over one or more RUs of a plurality of RUs allocated for data transmission according to the OFDMA structure. For example, controllers 159 and/or 154 (FIG. 1) may control, cause and/or trigger device 140 (FIG. 1) to wake up receiver 146 (FIG. 1) and to receive from device 102 (FIG. 1) one or more data packets over the one or more RUs of the plurality of RUs allocated for data transmission according to the OFDMA structure, e.g., as described above.

As indicated at block 906, the method may include receiving at the first wireless device a message including an indication of the wakeup RU allocation, for example, before reception of the wakeup packet. For example, device 140 (FIG. 1) may receive the message, and controllers 159 and/or 154 (FIG. 1) may control, cause and/or trigger device 140 (FIG. 1) to process the message from device 102 (FIG. 1) indicating the wakeup RU allocation, e.g., as described above.

As indicated at block 906, the method may include monitoring the wakeup RU allocation for the wakeup packet, e.g., based on the indication of the wakeup RU allocation. For example, controllers 159 and/or 154 (FIG. 1) may control, cause and/or trigger device 140 (FIG. 1) to monitor the wakeup RU allocation for the wakeup packet, e.g., as described above. In other embodiments, device 140 (FIG. 1) may be configured to monitor a predefined and/or preconfigured wakeup RU for the wakeup packet, e.g., as described above.

Figure 10:
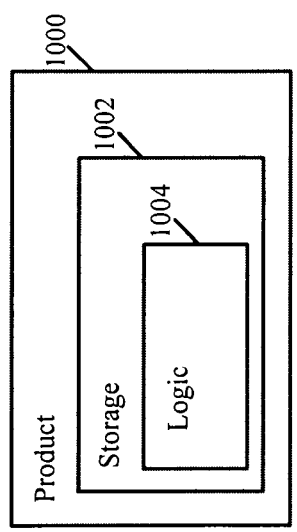
FIG. 10 is a schematic illustration of a product of manufacture, in accordance with some demonstrative embodiments.

Reference is made to FIG. 10, which schematically illustrates a product of manufacture 1000, in accordance with some demonstrative embodiments. Product 1000 may include one or more tangible computer-readable non-transitory storage media 1002, which may include computer-executable instructions, e.g., implemented by logic 1004, operable to, when executed by at least one computer processor, enable the at least one computer processor to implement one or more operations at device 102 (FIG. 1), device 140 (FIG. 1), radio 114 (FIG. 1), radio 144 (FIG. 1), wakeup receiver 150 (FIG. 1), transmitter 118 (FIG. 1), transmitter 148 (FIG. 1), receiver 116 (FIG. 1), receiver 146 (FIG. 1), receiver 156 (FIG. 1), controller 124 (FIG. 1), controller 154 (FIG. 1), controller 159 (FIG. 1), message processor 128 (FIG. 1), message processor 128 (FIG. 1), and/or message processor 158 (FIG. 1), message processor 157 (FIG. 1), and/or to perform, trigger and/or implement one or more operations described above with respect to FIG. 2, FIG. 3, FIG. 4, FIG. 5, FIG. 6, FIG. 7, FIG. 8, and/or FIG. 9, and/or one or more operations described herein. The phrase "non-transitory machine-readable medium" is directed to include all computer-readable media, with the sole exception being a transitory propagating signal.

In some demonstrative embodiments, product 1000 and/or machine-readable storage medium 1002 may include one or more types of computer-readable storage media capable of storing data, including volatile memory, non-volatile memory, removable or non-removable memory, erasable or non-erasable memory, writeable or re-writeable memory, and the like. For example, machine-readable storage medium 1002 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 1004 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 1004 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes an apparatus comprising circuitry and logic configured to cause a first wireless device to generate a wakeup packet configured to wake up a receiver of a second wireless device; and transmit the wakeup packet over a wakeup Resource Unit (RU) allocation of an Orthogonal Frequency Division Multiple Access (OFDMA) structure.

Example 2 includes the subject matter of Example 1, and optionally, wherein the apparatus is configured to cause the first wireless device to transmit a message including an indication of the wakeup RU allocation.

Example 3 includes the subject matter of Example 1 or 2, and optionally, wherein the OFDMA structure comprises a plurality of RUs allocated for data transmission, the wakeup RU allocation comprises at least one dedicated RU not allocated for data transmission.

Example 4 includes the subject matter of Example 3, and optionally, wherein the OFDMA structure comprises one or more RUs, which are not allocated for data transmission, separating the dedicated RU from the plurality of RUs allocated for data transmission.

Example 5 includes the subject matter of any one of Examples 1-4, and optionally, wherein the wakeup RU allocation comprises at least one central RU on both sides of a Direct Current (DC) tone.

Example 6 includes the subject matter of any one of Examples 1-5, and optionally, wherein the wakeup RU allocation comprises at least one 26-tone RU.

Example 7 includes the subject matter of any one of Examples 1-6, and optionally, wherein the wakeup RU allocation comprises two 26-tone RUs.

Example 8 includes the subject matter of any one of Examples 1-7, and optionally, wherein the wakeup RU allocation comprises at least one 52-tone RU.

Example 9 includes the subject matter of any one of Examples 1-8, and optionally, comprising a radio to transmit the wakeup packet.

Example 10 includes the subject matter of any one of Examples 1-9, and optionally, comprising one or more antennas, a processor, and a memory.

Example 11 includes a system of wireless communication comprising a first wireless device, the first wireless device comprising one or more antennas; a processor; a memory; and a controller configured to cause the first wireless device to generate a wakeup packet configured to wake up a receiver of a second wireless device; and transmit the wakeup packet over a wakeup Resource Unit (RU) allocation of an Orthogonal Frequency Division Multiple Access (OFDMA) structure.

Example 12 includes the subject matter of Example 11, and optionally, wherein the controller is configured to cause the first wireless device to transmit a message including an indication of the wakeup RU allocation.

Example 13 includes the subject matter of Example 11 or 12, and optionally, wherein the OFDMA structure comprises a plurality of RUs allocated for data transmission, the wakeup RU allocation comprises at least one dedicated RU not allocated for data transmission.

Example 14 includes the subject matter of Example 13, and optionally, wherein the OFDMA structure comprises one or more RUs, which are not allocated for data transmission, separating the dedicated RU from the plurality of RUs allocated for data transmission.

Example 15 includes the subject matter of any one of Examples 11-14, and optionally, wherein the wakeup RU allocation comprises at least one central RU on both sides of a Direct Current (DC) tone.

Example 16 includes the subject matter of any one of Examples 11-15, and optionally, wherein the wakeup RU allocation comprises at least one 26-tone RU.

Example 17 includes the subject matter of any one of Examples 11-16, and optionally, wherein the wakeup RU allocation comprises two 26-tone RUs.

Example 18 includes the subject matter of any one of Examples 11-17, and optionally, wherein the wakeup RU allocation comprises at least one 52-tone RU.

Example 19 includes the subject matter of any one of Examples 11-18, and optionally, wherein the first wireless device comprises a radio to transmit the wakeup packet.

Example 20 includes a method to be performed by a first wireless device, the method comprising generating a wakeup packet configured to wake up a receiver of a second wireless device; and transmitting the wakeup packet over a wakeup Resource Unit (RU) allocation of an Orthogonal Frequency Division Multiple Access (OFDMA) structure.

Example 21 includes the subject matter of Example 20, and optionally, comprising transmitting a message including an indication of the wakeup RU allocation.

Example 22 includes the subject matter of Example 20 or 21, and optionally, wherein the OFDMA structure comprises a plurality of RUs allocated for data transmission, the wakeup RU allocation comprises at least one dedicated RU not allocated for data transmission.

Example 23 includes the subject matter of Example 22, and optionally, wherein the OFDMA structure comprises one or more RUs, which are not allocated for data transmission, separating the dedicated RU from the plurality of RUs allocated for data transmission.

Example 24 includes the subject matter of any one of Examples 20-23, and optionally, wherein the wakeup RU allocation comprises at least one central RU on both sides of a Direct Current (DC) tone.

Example 25 includes the subject matter of any one of Examples 20-24, and optionally, wherein the wakeup RU allocation comprises at least one 26-tone RU.

Example 26 includes the subject matter of any one of Examples 20-25, and optionally, wherein the wakeup RU allocation comprises two 26-tone RUs.

Example 27 includes the subject matter of any one of Examples 20-26, and optionally, wherein the wakeup RU allocation comprises at least one 52-tone RU.

Example 28 includes a product comprising one or more tangible computer-readable non-transitory storage media comprising computer-executable instructions operable to, when executed by at least one computer processor, enable the at least one computer processor to implement one or more operations at a first wireless device, the operations comprising generating a wakeup packet configured to wake up a receiver of a second wireless device; and transmitting the wakeup packet over a wakeup Resource Unit (RU) allocation of an Orthogonal Frequency Division Multiple Access (OFDMA) structure.

Example 29 includes the subject matter of Example 28, and optionally, wherein the operations comprise transmitting a message including an indication of the wakeup RU allocation.

Example 30 includes the subject matter of Example 28 or 29, and optionally, wherein the OFDMA structure comprises a plurality of RUs allocated for data transmission, the wakeup RU allocation comprises at least one dedicated RU not allocated for data transmission.

Example 31 includes the subject matter of Example 30, and optionally, wherein the OFDMA structure comprises one or more RUs, which are not allocated for data transmission, separating the dedicated RU from the plurality of RUs allocated for data transmission.

Example 32 includes the subject matter of any one of Examples 28-31, and optionally, wherein the wakeup RU allocation comprises at least one central RU on both sides of a Direct Current (DC) tone.

Example 33 includes the subject matter of any one of Examples 28-32, and optionally, wherein the wakeup RU allocation comprises at least one 26-tone RU.

Example 34 includes the subject matter of any one of Examples 28-33, and optionally, wherein the wakeup RU allocation comprises two 26-tone RUs.

Example 35 includes the subject matter of any one of Examples 28-34, and optionally, wherein the wakeup RU allocation comprises at least one 52-tone RU.

Example 36 includes an apparatus of a first wireless device, the apparatus comprising means for generating a wakeup packet configured to wake up a receiver of a second wireless device; and means for transmitting the wakeup packet over a wakeup Resource Unit (RU) allocation of an Orthogonal Frequency Division Multiple Access (OFDMA) structure.

Example 37 includes the subject matter of Example 36, and optionally, comprising means for transmitting a message including an indication of the wakeup RU allocation.

Example 38 includes the subject matter of Example 36 or 37, and optionally, wherein the OFDMA structure comprises a plurality of RUs allocated for data transmission, the wakeup RU allocation comprises at least one dedicated RU not allocated for data transmission.

Example 39 includes the subject matter of Example 38, and optionally, wherein the OFDMA structure comprises one or more RUs, which are not allocated for data transmission, separating the dedicated RU from the plurality of RUs allocated for data transmission.

Example 40 includes the subject matter of any one of Examples 36-39, and optionally, wherein the wakeup RU allocation comprises at least one central RU on both sides of a Direct Current (DC) tone.

Example 41 includes the subject matter of any one of Examples 36-40, and optionally, wherein the wakeup RU allocation comprises at least one 26-tone RU.

Example 42 includes the subject matter of any one of Examples 36-41, and optionally, wherein the wakeup RU allocation comprises two 26-tone RUs.

Example 43 includes the subject matter of any one of Examples 36-42, and optionally, wherein the wakeup RU allocation comprises at least one 52-tone RU.

Example 44 includes an apparatus comprising circuitry and logic configured to cause a first wireless device to process a wakeup packet received from a second wireless device over a wakeup Resource Unit (RU) allocation of an Orthogonal Frequency Division Multiple Access (OFDMA) structure; and based on the wakeup packet, wake up a receiver of the first wireless device to receive from the second wireless device one or more data packets over one or more RUs of a plurality of RUs allocated for data transmission according to the OFDMA structure.

Example 45 includes the subject matter of Example 44, and optionally, wherein the apparatus is configured to cause the first wireless device to process reception of a message including an indication of the wakeup RU allocation before reception of the wakeup packet, and, based on the indication of the wakeup RU allocation, to monitor the wakeup RU allocation for the wakeup packet.

Example 46 includes the subject matter of Example 44 or 45, and optionally, wherein the wakeup RU allocation comprises at least one dedicated RU not allocated for the data transmission.

Example 47 includes the subject matter of Example 46, and optionally, wherein the OFDMA structure comprises one or more RUs, which are not allocated for data transmission, separating the dedicated RU from the plurality of RUs allocated for data transmission.

Example 48 includes the subject matter of any one of Examples 44-47, and optionally, wherein the apparatus is configured to cause the first wireless device to monitor the wakeup RU allocation for the wakeup packet.

Example 49 includes the subject matter of any one of Examples 44-48, and optionally, wherein the wakeup RU allocation comprises at least one central RU on both sides of a Direct Current (DC) tone.

Example 50 includes the subject matter of any one of Examples 44-49, and optionally, wherein the wakeup RU allocation comprises at least one 26-tone RU.

Example 51 includes the subject matter of any one of Examples 44-50, and optionally, wherein the wakeup RU allocation comprises two 26-tone RUs.

Example 52 includes the subject matter of any one of Examples 44-51, and optionally, wherein the wakeup RU allocation comprises at least one 52-tone RU.

Example 53 includes the subject matter of any one of Examples 44-52, and optionally, comprising a wakeup receiver to process the wakeup packet.

Example 54 includes the subject matter of any one of Examples 44-53, and optionally, comprising one or more antennas, a processor, and a memory.

Example 55 includes a system of wireless communication comprising a first wireless device, the first wireless device comprising one or more antennas; a processor; a memory; and a controller configured to cause the first wireless device to process a wakeup packet received from a second wireless device over a wakeup Resource Unit (RU) allocation of an Orthogonal Frequency Division Multiple Access (OFDMA) structure; and based on the wakeup packet, wake up a receiver of the first wireless device to receive from the second wireless device one or more data packets over one or more RUs of a plurality of RUs allocated for data transmission according to the OFDMA structure.

Example 56 includes the subject matter of Example 55, and optionally, wherein the controller is configured to cause the first wireless device to process reception of a message including an indication of the wakeup RU allocation before reception of the wakeup packet, and, based on the indication of the wakeup RU allocation, to monitor the wakeup RU allocation for the wakeup packet.

Example 57 includes the subject matter of Example 55 or 56, and optionally, wherein the wakeup RU allocation comprises at least one dedicated RU not allocated for the data transmission.

Example 58 includes the subject matter of Example 57, and optionally, wherein the OFDMA structure comprises one or more RUs, which are not allocated for data transmission, separating the dedicated RU from the plurality of RUs allocated for data transmission.

Example 59 includes the subject matter of any one of Examples 55-58, and optionally, wherein the controller is configured to cause the first wireless device to monitor the wakeup RU allocation for the wakeup packet.

Example 60 includes the subject matter of any one of Examples 55-59, and optionally, wherein the wakeup RU allocation comprises at least one central RU on both sides of a Direct Current (DC) tone.

Example 61 includes the subject matter of any one of Examples 55-60, and optionally, wherein the wakeup RU allocation comprises at least one 26-tone RU.

Example 62 includes the subject matter of any one of Examples 55-61, and optionally, wherein the wakeup RU allocation comprises two 26-tone RUs.

Example 63 includes the subject matter of any one of Examples 55-62, and optionally, wherein the wakeup RU allocation comprises at least one 52-tone RU.

Example 64 includes the subject matter of any one of Examples 55-63, and optionally, wherein the first wireless device comprises a wakeup receiver to process the wakeup packet.

Example 65 includes a method to be performed by a first wireless device, the method comprising processing a wakeup packet received from a second wireless device over a wakeup Resource Unit (RU) allocation of an Orthogonal Frequency Division Multiple Access (OFDMA) structure; and based on the wakeup packet, waking up a receiver of the first wireless device to receive from the second wireless device one or more data packets over one or more RUs of a plurality of RUs allocated for data transmission according to the OFDMA structure.

Example 66 includes the subject matter of Example 65, and optionally, comprising processing reception of a message including an indication of the wakeup RU allocation before reception of the wakeup packet, and, based on the indication of the wakeup RU allocation, monitoring the wakeup RU allocation for the wakeup packet.

Example 67 includes the subject matter of Example 65 or 66, and optionally, wherein the wakeup RU allocation comprises at least one dedicated RU not allocated for the data transmission.

Example 68 includes the subject matter of Example 67, and optionally, wherein the OFDMA structure comprises one or more RUs, which are not allocated for data transmission, separating the dedicated RU from the plurality of RUs allocated for data transmission.

Example 69 includes the subject matter of any one of Examples 65-68, and optionally, comprising monitoring the wakeup RU allocation for the wakeup packet.

Example 70 includes the subject matter of any one of Examples 65-69, and optionally, wherein the wakeup RU allocation comprises at least one central RU on both sides of a Direct Current (DC) tone.

Example 71 includes the subject matter of any one of Examples 65-70, and optionally, wherein the wakeup RU allocation comprises at least one 26-tone RU.

Example 72 includes the subject matter of any one of Examples 65-71, and optionally, wherein the wakeup RU allocation comprises two 26-tone RUs.

Example 73 includes the subject matter of any one of Examples 65-72, and optionally, wherein the wakeup RU allocation comprises at least one 52-tone RU.

Example 74 includes a product comprising one or more tangible computer-readable non-transitory storage media comprising computer-executable instructions operable to, when executed by at least one computer processor, enable the at least one computer processor to implement one or more operations at a first wireless device, the operations comprising processing a wakeup packet received from a second wireless device over a wakeup Resource Unit (RU) allocation of an Orthogonal Frequency Division Multiple Access (OFDMA) structure; and based on the wakeup packet, waking up a receiver of the first wireless device to receive from the second wireless device one or more data packets over one or more RUs of a plurality of RUs allocated for data transmission according to the OFDMA structure.

Example 75 includes the subject matter of Example 74, and optionally, wherein the operations comprise processing reception of a message including an indication of the wakeup RU allocation before reception of the wakeup packet, and, based on the indication of the wakeup RU allocation, monitoring the wakeup RU allocation for the wakeup packet.

Example 76 includes the subject matter of Example 74 or 75, and optionally, wherein the wakeup RU allocation comprises at least one dedicated RU not allocated for the data transmission.

Example 77 includes the subject matter of Example 76, and optionally, wherein the OFDMA structure comprises one or more RUs, which are not allocated for data transmission, separating the dedicated RU from the plurality of RUs allocated for data transmission.

Example 78 includes the subject matter of any one of Examples 74-77, and optionally, wherein the operations comprise monitoring the wakeup RU allocation for the wakeup packet.

Example 79 includes the subject matter of any one of Examples 74-78, and optionally, wherein the wakeup RU allocation comprises at least one central RU on both sides of a Direct Current (DC) tone.

Example 80 includes the subject matter of any one of Examples 74-79, and optionally, wherein the wakeup RU allocation comprises at least one 26-tone RU.

Example 81 includes the subject matter of any one of Examples 74-80, and optionally, wherein the wakeup RU allocation comprises two 26-tone RUs.

Example 82 includes the subject matter of any one of Examples 74-81, and optionally, wherein the wakeup RU allocation comprises at least one 52-tone RU.

Example 83 includes an apparatus of a first wireless device, the apparatus comprising means for processing a wakeup packet received from a second wireless device over a wakeup Resource Unit (RU) allocation of an Orthogonal Frequency Division Multiple Access (OFDMA) structure; and means for, based on the wakeup packet, waking up a receiver of the first wireless device to receive from the second wireless device one or more data packets over one or more RUs of a plurality of RUs allocated for data transmission according to the OFDMA structure.

Example 84 includes the subject matter of Example 83, and optionally, comprising means for processing reception of a message including an indication of the wakeup RU allocation before reception of the wakeup packet, and, based on the indication of the wakeup RU allocation, monitoring the wakeup RU allocation for the wakeup packet.

Example 85 includes the subject matter of Example 83 or 84, and optionally, wherein the wakeup RU allocation comprises at least one dedicated RU not allocated for the data transmission.

Example 86 includes the subject matter of Example 85, and optionally, wherein the OFDMA structure comprises one or more RUs, which are not allocated for data transmission, separating the dedicated RU from the plurality of RUs allocated for data transmission.

Example 87 includes the subject matter of any one of Examples 83-86, and optionally, comprising means for monitoring the wakeup RU allocation for the wakeup packet.

Example 88 includes the subject matter of any one of Examples 83-87, and optionally, wherein the wakeup RU allocation comprises at least one central RU on both sides of a Direct Current (DC) tone.

Example 89 includes the subject matter of any one of Examples 83-88, and optionally, wherein the wakeup RU allocation comprises at least one 26-tone RU.

Example 90 includes the subject matter of any one of Examples 83-89, and optionally, wherein the wakeup RU allocation comprises two 26-tone RUs.

Example 91 includes the subject matter of any one of Examples 83-90, and optionally, wherein the wakeup RU allocation comprises at least one 52-tone RU.

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An apparatus comprising circuitry and logic configured to cause a first wireless device to:
  generate a wakeup packet configured to wake up a receiver of a second wireless device; and
  transmit the wakeup packet over a wakeup Resource Unit (RU) allocation of an Orthogonal Frequency Division Multiple Access (OFDMA) structure, the OFDMA structure comprising the wakeup RU allocation and a plurality of other RU allocations, the wakeup RU allocation dedicated for communication of the wakeup packet, the plurality of other RU allocations allocated for OFDMA communication of one or more data packets, the wakeup RU allocation comprises one or more sub-bands at a center of an OFDMA channel, and the plurality of other RU allocations comprises one or more other sub-bands of the OFDMA channel.

2. The apparatus of claim 1 configured to cause the first wireless device to transmit a message including an indication of the wakeup RU allocation.

3. The apparatus of claim 1, wherein the OFDMA structure comprises one or more RUs, which are not allocated for transmission of the one or more data packets, and which separate the wakeup RU allocation from the plurality of other RU allocations allocated for the OFDMA communication of the one or more data packets.

4. The apparatus of claim 1, wherein the OFDMA structure comprises the wakeup RU allocation on both sides of a Direct Current (DC) tone, a first blank RU allocation on a first side of the wakeup RU allocation, and a second blank RU allocation on a second side of the wakeup RU allocation, the first blank RU allocation separating between the wakeup RU allocation and a first RU allocation of the plurality of other RU allocations, the second blank RU allocation separating between the wakeup RU allocation and a second RU allocation of the plurality of other RU allocations.

5. The apparatus of claim 1, wherein the wakeup RU allocation comprises at least one 26-tone RU.

6. The apparatus of claim 1, wherein the wakeup RU allocation comprises two 26-tone RUs.

7. The apparatus of claim 1, wherein the wakeup RU allocation comprises at least one 52-tone RU.

8. The apparatus of claim 1 comprising a radio to transmit the wakeup packet.

9. The apparatus of claim 1 comprising one or more antennas, a processor, and a memory.

10. A product comprising one or more tangible computer-readable non-transitory storage media comprising computer-executable instructions operable to, when executed by at least one processor, enable the at least one processor to cause a first wireless device to:
generate a wakeup packet configured to wake up a receiver of a second wireless device; and
transmit the wakeup packet over a wakeup Resource Unit (RU) allocation of an Orthogonal Frequency Division Multiple Access (OFDMA) structure, the OFDMA structure comprising the wakeup RU allocation and a plurality of other RU allocations, the wakeup RU allocation dedicated for communication of the wakeup packet, the plurality of other RU allocations allocated for OFDMA communication of one or more data packets, the wakeup RU allocation comprises one or more sub-bands at a center of an OFDMA channel, and the plurality of other RU allocations comprises one or more other sub-bands of the OFDMA channel.

11. The product of claim 10, wherein the OFDMA structure comprises one or more RUs, which are not allocated for transmission of the one or more data packets, and which separate the wakeup RU allocation from the plurality of other RU allocations allocated for the OFDMA communication of the one or more data packets.

12. An apparatus comprising circuitry and logic configured to cause a first wireless device to:
process a wakeup packet received from a second wireless device over a wakeup Resource Unit (RU) allocation of an Orthogonal Frequency Division Multiple Access (OFDMA) structure, the OFDMA structure comprising the wakeup RU allocation and a plurality of other RU allocations, the wakeup RU allocation dedicated for communication of the wakeup packet, the plurality of other RU allocations allocated for OFDMA data transmission, the wakeup RU allocation comprises one or more sub-bands at a center of an OFDMA channel, and the plurality of other RU allocations comprises one or more other sub-bands of the OFDMA channel; and
based on the wakeup packet, wake up a receiver of the first wireless device to receive from the second wireless device one or more data packets over one or more RUs of the plurality of other RU allocations allocated for OFDMA data transmission according to the OFDMA structure.

13. The apparatus of claim 12 configured to cause the first wireless device to process reception of a message including an indication of the wakeup RU allocation before reception of the wakeup packet, and, based on the indication of the wakeup RU allocation, to monitor the wakeup RU allocation for the wakeup packet.

14. The apparatus of claim 12, wherein the OFDMA structure comprises one or more RUs, which are not allocated for data transmission, and which separate the wakeup RU allocation from the plurality of other RU allocations allocated for OFDMA data transmission.

15. The apparatus of claim 12 configured to cause the first wireless device to monitor the wakeup RU allocation for the wakeup packet.

16. The apparatus of claim 12, wherein the OFDMA structure comprises the wakeup RU allocation on both sides of a Direct Current (DC) tone, a first blank RU allocation on a first side of the wakeup RU allocation, and a second blank RU allocation on a second side of the wakeup RU allocation, the first blank RU allocation separating between the wakeup RU allocation and a first RU allocation of the plurality of other RU allocations, the second blank RU allocation separating between the wakeup RU allocation and a second RU allocation of the plurality of other RU allocations.

17. The apparatus of claim 12, wherein the wakeup RU allocation comprises at least one 26-tone RU.

18. The apparatus of claim 12, wherein the wakeup RU allocation comprises two 26-tone RUs.

19. The apparatus of claim 12, wherein the wakeup RU allocation comprises at least one 52-tone RU.

20. The apparatus of claim 12 comprising a wakeup receiver to process the wakeup packet.

21. The apparatus of claim 12 comprising one or more antennas, a processor, and a memory.

22. A product comprising one or more tangible computer-readable non-transitory storage media comprising computer-executable instructions operable to, when executed by at least one processor, enable the at least one processor to cause a first wireless device to:
process a wakeup packet received from a second wireless device over a wakeup Resource Unit (RU) allocation of an Orthogonal Frequency Division Multiple Access (OFDMA) structure, the OFDMA structure comprising the wakeup RU allocation and a plurality of other RU allocations, the wakeup RU allocation dedicated for communication of the wakeup packet, the plurality of other RU allocations allocated for OFDMA data transmission, the wakeup RU allocation comprises one or more sub-bands at a center of an OFDMA channel, and the plurality of other RU allocations comprises one or more other sub-bands of the OFDMA channel; and
based on the wakeup packet, wake up a receiver of the first wireless device to receive from the second wireless device one or more data packets over one or more RUs of the plurality of other RU allocations allocated for OFDMA data transmission according to the OFDMA structure.

23. The product of claim 22, wherein the instructions, when executed, cause the first wireless device to process reception of a message including an indication of the wakeup RU allocation before reception of the wakeup packet, and, based on the indication of the wakeup RU allocation, to monitor the wakeup RU allocation for the wakeup packet.

* * * * *